United States Patent
Vanhoucke

(10) Patent No.: US 8,442,821 B1
(45) Date of Patent: May 14, 2013

(54) MULTI-FRAME PREDICTION FOR HYBRID NEURAL NETWORK/HIDDEN MARKOV MODELS

(75) Inventor: Vincent Vanhoucke, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/560,706

(22) Filed: Jul. 27, 2012

(51) Int. Cl.
*G10L 15/14* (2006.01)

(52) U.S. Cl.
USPC .......................................... 704/232; 704/256

(58) Field of Classification Search ................... 704/232, 704/256–256.8
See application file for complete search history.

(56) References Cited

U.S. PATENT DOCUMENTS

| | | | |
|---|---|---|---|
| 5,502,790 A | 3/1996 | Yi | |
| 5,535,305 A | 7/1996 | Acero et al. | |
| 5,548,684 A | 8/1996 | Wang et al. | |
| 5,555,344 A * | 9/1996 | Zunkler | 704/242 |
| 5,692,100 A | 11/1997 | Tsuboka et al. | |
| 5,737,486 A | 4/1998 | Iso | |
| 5,794,197 A | 8/1998 | Alleva et al. | |
| 5,867,816 A | 2/1999 | Nussbaum | |
| 5,930,754 A | 7/1999 | Karaali et al. | |
| 6,233,550 B1 | 5/2001 | Gersho et al. | |
| 6,363,289 B1 | 3/2002 | Keeler et al. | |
| 6,475,245 B2 | 11/2002 | Gersho et al. | |
| 6,760,699 B1 | 7/2004 | Weerackody et al. | |
| 6,963,835 B2 | 11/2005 | Kimball et al. | |
| 7,467,086 B2 | 12/2008 | Menendez-Pidal et al. | |
| 7,496,512 B2 | 2/2009 | Zhao et al. | |
| 7,574,357 B1 | 8/2009 | Jorgensen et al. | |
| 7,660,774 B2 | 2/2010 | Mukherjee et al. | |
| 7,826,894 B2 | 11/2010 | Musallam et al. | |
| 8,010,358 B2 | 8/2011 | Chen | |
| 8,126,710 B2 | 2/2012 | Gemello et al. | |
| 8,239,195 B2 | 8/2012 | Li et al. | |
| 8,311,827 B2 | 11/2012 | Hernandez et al. | |
| 2004/0064315 A1 | 4/2004 | Deisher et al. | |
| 2004/0236573 A1 | 11/2004 | Sapeluk | |
| 2008/0147391 A1* | 6/2008 | Jeong et al. | 704/232 |
| 2008/0208577 A1* | 8/2008 | Jeong et al. | 704/231 |
| 2010/0185436 A1* | 7/2010 | Saleh et al. | 704/9 |
| 2010/0198598 A1* | 8/2010 | Herbig et al. | 704/240 |
| 2010/0217589 A1 | 8/2010 | Gruhn et al. | |
| 2011/0288855 A1 | 11/2011 | Roy | |

OTHER PUBLICATIONS

Notice of Allowance in U.S. Appl. No. 13/560,740 mailed Nov. 7, 2012.

(Continued)

*Primary Examiner* — Abul Azad

(74) *Attorney, Agent, or Firm* — McDonnell Boehnen Hulbert & Berghoff LLP

(57) ABSTRACT

A method and system for multi-frame prediction in a hybrid neural network/hidden Markov model automatic speech recognition (ASR) system is disclosed. An audio input signal may be transformed into a time sequence of feature vectors, each corresponding to respective temporal frame of a sequence of periodic temporal frames of the audio input signal. The time sequence of feature vectors may be concurrently input to a neural network, which may process them concurrently. In particular, the neural network may concurrently determine for the time sequence of feature vectors a set of emission probabilities for a plurality of hidden Markov models of the ASR system, where the set of emission probabilities are associated with the temporal frames. The set of emission probabilities may then be concurrently applied to the hidden Markov models for determining speech content of the audio input signal.

20 Claims, 10 Drawing Sheets

OTHER PUBLICATIONS

N. Morgan and H. Bourlard. "An Introduction to Hybrid HMM/Connectionist Continuous Speech Recognition". IEEE Signal Processing Magazine, pp. 25-42, May 1995.

Daniel J. Kershaw. "Phonetic Context-Dependency in a Hybrid ANN/HMM Speech Recognition System". St. John's College University of Cambridge. Jan. 28, 1997, pp. i-x, 1-116.

Sim et al. "Stream-based context-sensitive phone mapping for cross-lingual speech recognition." Interspeech 2009, Sep. 2009, pp. 3019-3022.

Sim, Khe Chai. "Discriminative product-of-expert acoustic mapping for cross-lingual phone recognition." Automatic Speech Recognition & Understanding, 2009. ASRU 2009. IEEE Workshop on. IEEE, Dec. 2009, pp. 546-551.

Guangsen et al. "Comparison of Smoothing Techniques for Robust Context Dependent Acoustic Modelling in Hybrid NN/HMM Systems." Interspeech 2001, Aug. 2011, pp. 457-460.

Young et al. "Tree-based state tying for high accuracy acoustic modelling." Proceedings of the workshop on Human Language Technology. Association for Computational Linguistics, 1994, pp. 307-312.

Ziegenhain et al. "Triphone tying techniques combining a-priori rules and data driven methods." European Conference on Speech Communication and Technology (EUROSPEECH). vol. 2. 2001, pp. 1-4.

Ming, Ji, and F. Jack Smith. "Improved phone recognition using Bayesian triphone models." Acoustics, Speech and Signal Processing, 1998. Proceedings of the 1998 IEEE International Conference on. vol. 1. IEEE, 1998, pp. 1-4.

Office Action in U.S. Appl. No. 13/560,658 mailed Dec. 12, 2012.

* cited by examiner

MULTI-FRAME PREDICTION FOR HYBRID NEURAL NETWORK/HIDDEN MARKOV MODELS

BACKGROUND

Unless otherwise indicated herein, the materials described in this section are not prior art to the claims in this application and are not admitted to be prior art by inclusion in this section.

A goal of automatic speech recognition (ASR) technology is to map a particular utterance to an accurate textual representation, or other symbolic representation, of that utterance. For instance, ASR performed on the utterance "my dog has fleas" would ideally be mapped to the text string "my dog has fleas," rather than the nonsensical text string "my dog has freeze," or the reasonably sensible but inaccurate text string "my bog has trees." Various technologies, including computers, network servers, telephones, and personal digital assistants (PDAs), can be employed to implement an ASR system, or one or more components of such a system. Communication networks may in turn provide communication paths and links between some or all of such devices, supporting ASR capabilities and services that may utilize ASR capabilities.

BRIEF SUMMARY

In one aspect, an example embodiment presented herein provides, a method comprising transforming an audio input signal, using one or more processors of a system, into a first time sequence of feature vectors, each respective feature vector of the first time sequence bearing quantitative measures of acoustic properties of a corresponding, respective temporal frame of a first sequence of temporal frames of the audio input signal; providing, at a first time step, the first time sequence of feature vectors as input to a neural network (NN) implemented by the one or more processors of the system; processing the feature vectors in the first time sequence concurrently by the NN, wherein processing the feature vectors in the first time sequence concurrently by the NN comprises determining, at the first time step, for each feature vector in the first time sequence a respective set of emission probabilities for a first plurality of hidden Markov models (HMMs); and applying the emission probabilities determined at the first time step for the feature vectors in the first time sequence to the first plurality of HMMs to determine speech content corresponding to the first sequence of temporal frames of the audio input signal.

In another aspect, an example embodiment presented herein provides, a system comprising: one or more processors; memory; and machine-readable instructions stored in the memory, that upon execution by the one or more processors cause the system to carry out functions including: transforming an audio input signal into a first time sequence of feature vectors, wherein each respective feature vector of the first time sequence bears quantitative measures of acoustic properties of a corresponding, respective temporal frame of a first sequence of temporal frames of the audio input signal, providing, at a first time step, the first time sequence of feature vectors as input to a neural network (NN) implemented by the system, processing the feature vectors in the first time sequence concurrently by the NN, wherein processing the feature vectors in the first time sequence concurrently by the NN comprises determining, at the first time step, for each feature vector in the first time sequence a respective set of emission probabilities for a first plurality of hidden Markov models (HMMs), and applying the emission probabilities determined at the first time step for the feature vectors in the first time sequence to the first plurality of HMMs to determine speech content corresponding to the first sequence of temporal frames of the audio input signal.

In still another aspect, an article of manufacture including a computer-readable storage medium, having stored thereon program instructions that, upon execution by one or more processors of a system, cause the system to perform operations comprising: transforming an audio input signal into a first time sequence of feature vectors, wherein each respective feature vector of the first time sequence bears quantitative measures of acoustic properties of a corresponding, respective temporal frame of a first sequence of temporal frames of the audio input signal; providing, at a first time step, the first time sequence of feature vectors as input to a neural network (NN) implemented by the system; processing the feature vectors in the first time sequence concurrently by the NN, wherein processing the feature vectors in the first time sequence concurrently by the NN comprises determining, at the first time step, for each feature vector in the first time sequence a respective set of emission probabilities for a first plurality of hidden Markov models (HMMs); and applying the emission probabilities determined at the first time step for the feature vectors in the first time sequence to the first plurality of HMMs to determine speech content corresponding to the first sequence of temporal frames of the audio input signal.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1:
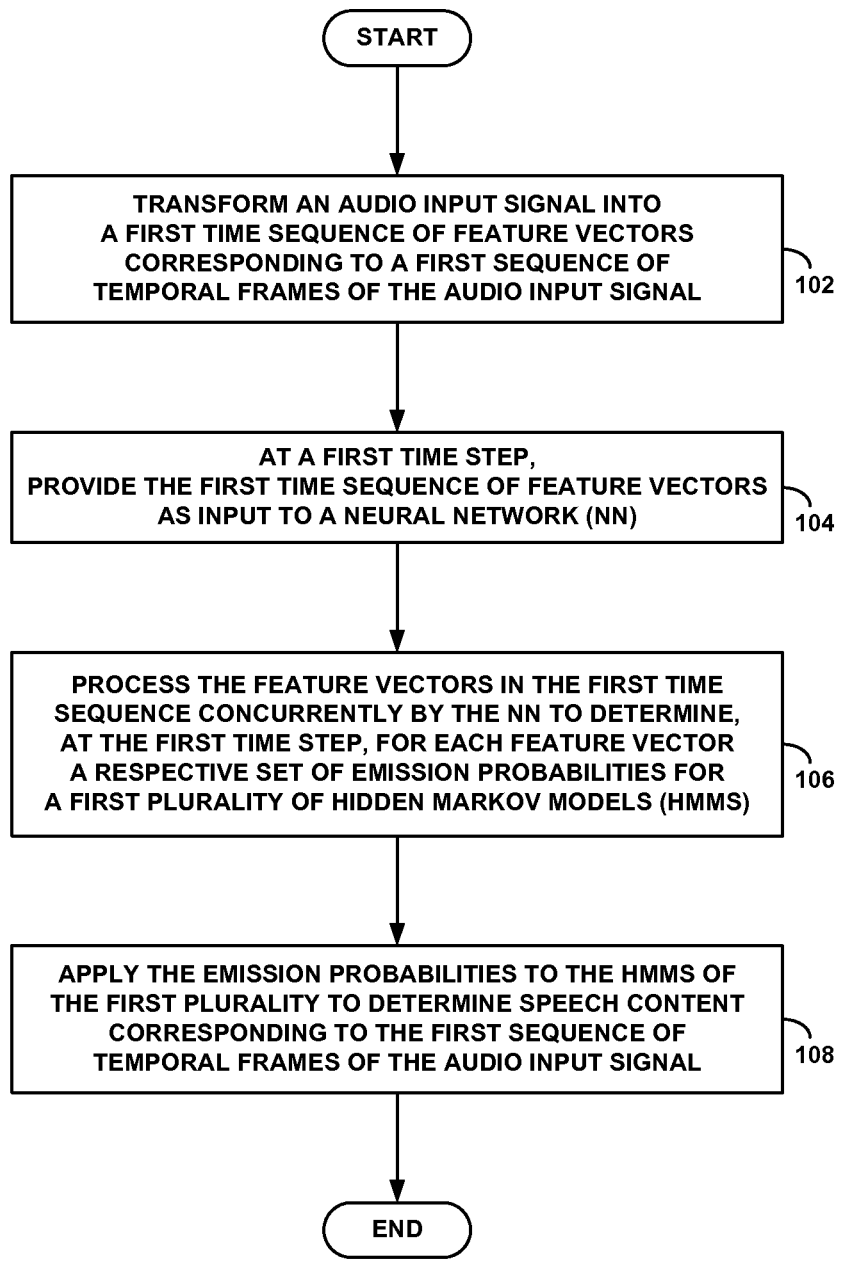
FIG. 1 is a flowchart illustrating an example method in accordance with an example embodiment.

An automatic speech recognition (ASR) system can be a processor-based system configured to recognize a spoken utterance in an audio input signal, and responsively carry out an action associated with, or corresponding to, recognition of the utterance. The spoken utterance could be a word, multiple words, a phrase, multiple phrases, a sentence, multiple sentences, or other segment of speech, for example. The source of the spoken utterance could be a live person speaking in real time into a microphone, telephone, or other audio input/transmission device/system, for example, that then produces and supplies the audio signal as input to the ASR system. The source of the spoken utterance could also be previously-recorded speech that is played out via an audio output device/system, for example, and supplied as the audio input signal to the ASR system. The action associated with, or corresponding to, recognition of the utterance could be translation of the recognized utterance into text, and output and/or recording of the text. The action could also be generation of a response to the recognized utterance, such as synthesis of a reply (e.g., via a voice/sound synthesis device/system), or carrying out a command. Other responses are possible as well.

An ASR system may operate by receiving an input audio signal, processing the audio input signal (e.g., using a digital signal processor) to generate a quantified representation of the signal, and then performing pattern recognition in which the quantified representation of the input signal is matched in some manner against a stored body of similarly quantified representations. The stored body, often referred to as a "corpus," is typically a large collection of speech samples that have been digitally processed, deconstructed, and categorized into a finite set of small, fundamental units of speech sounds, as well as possibly a finite set of larger speech segments (e.g., words, phrases, etc.). The fundamental units may also have associated "tags" or labels that can be used to identify them for purposes of generating text or other output from strings or sequences of units, for example.

By way of example, the small fundamental units could be phonemes. There are, for example, approximately 40 phonemes in spoken English. Spoken words (or other segments of speech) can be constructed from appropriate sequences of subsets of these phonemes. For example, phonemes frequently occur in particular triplet combinations referred to as "triphones." In a triphone, a given phoneme can appear in the context of a preceding phoneme and a following (subsequent) phoneme. Accordingly, the fundamental units could instead be, or in addition include, triphones. It is also possible to recognize "quinphones" (groups of five phonemes), as well as other grouping sizes.

The phonemes (or other small fundamental speech units) of the corpus can be represented and stored in one or another quantitative form. Accordingly, by processing the audio input signal in short units that can be quantitatively compared with stored phonemes or sequences of the stored phonemes, a matching technique can be employed to identify a likely sequence or sequences of stored phonemes that corresponds to the processed audio input signal. In this way, the spoken utterance in the input audio signal can be recognized as corresponding to a synthesized utterance reconstructed from the corpus of stored speech sounds.

At a high-level, the architecture of an ASR system may include a signal processing component, a pattern classification component, an acoustic model component, a language model component, and a dictionary component (among other possible components). The signal processing component receives the audio input signal, digitally samples it within a sequence of time frames, and processes the frame samples to generate a corresponding sequence of "feature vectors." Each feature vector includes a set of measured and/or derived elements that characterize the acoustic content of the corresponding time frame. This process is sometimes referred to as "feature extraction." The acoustic content represented in a feature vector can correspond to some portion of one or more fundamental speech units (e.g., phoneme, triphone, etc.), and thus can be used for matching against the speech units of the corpus.

The pattern classification component receives a sequence of feature vectors as input, and can apply the acoustic model, language model, and dictionary in order to carry out the recognition process. The acoustic model can access the corpus and can implement the search/comparison process to determine optimal sequences of phonemes, triphones, or other fundamental speech units. The language model includes rules of the spoken language (e.g., grammar, syntax, etc.) that can be applied to help guide and/or constrain the recognition process, while the dictionary component may provide semantic constraints at the word level. The corpus may also include identifications or "labels" of its contents, so that the synthesized utterances reconstructed from the corpus of stored speech sounds can be rendered in text or other formats suitable for enabling the ASR system to generate a response (or responses) to recognition of spoken utterances. The output of the pattern classification component is the recognized speech carried in the utterance. The form of the output could be a text string or an action corresponding to the recognized speech, for example.

Among various approaches for implementing the acoustic model, the "hybrid neural network/hidden Markov model" (HNN/HMM) approaches can provide computational advantages. In a HNN/HMM approach, phonemes, triphones, or other fundamental speech units are modeled probabilistically as respective groupings of HMM states. More specifically, each fundamental speech unit is seen as temporally evolving according to some sequence of temporal phases of the speech unit. It has been observed empirically, for example, that phonemes manifest in speech across three acoustic phases: a start, a middle, and an end. A given phoneme (or other fundamental speech unit) therefore can be reasonably modeled with three states, one corresponding to each acoustic phase. Transitions between states are governed by transition probabilities of the model. In addition, each state has an associated "emission probability" for "emitting" an output corresponding to the acoustic phase of the phoneme. For purposes of the discussion herein, the three HMM states described as modeling a given phoneme (or other fundamental speech unit) will be referred to collectively simply as "a HMM for the given phoneme." Thus, a HMM for a given phoneme (or other fundamental speech unit) will be understood as being characterized by probabilities of transitioning from a current state to a next state, and upon transitioning, a respective probability of producing (emitting) the acoustic phase associated with the next state. It will be appreciated that a HMM for modeling a fundamental speech unit is not necessarily limited to three states, and that HMMs with greater than or fewer than three states are possible.

Sequential feature vectors derived from an audio input stream represent a stream of observed acoustic data, while sequential states of one or more HMMs may be concatenated to represent probable sequences of phonemes, triphones, or other fundamental speech units in the corpus that correspond to the observed acoustic data. The term "concatenated HMMs" will be used to refer to a concatenation of respective groupings of HMM states, where each respective grouping models a fundamental speech unit (as defined above). The states and models are "hidden" in the sense that, while the possible states and their associated transition and emission probabilities may be known, the specific state sequences associated with any given observed sequence of feature vectors is not a priori known. Recognition of utterances (speech) in the audio input signal therefore can be thought of as determining the most probable sequence (or sequences) of states of one or more concatenated HMMs that would produce the observed feature vectors. The most probable sequence of states then corresponds to the most probable sequence of phonemes, triphones, or other fundamental speech units in the corpus, from which the input utterance can be reconstructed and thereby recognized.

In conventional HNN/HMM operation, the determination of the most probable sequences of HMMs and states is carried out one step at a time, with each time step corresponding to the next feature vector (i.e., frame) in the observed (input) stream. The neural network in the HNN/HMM approach functions to generate the emission probabilities for all of the states that need to be considered at each step. The input to the neural network is one or more feature vectors. Thus, at a high level, the neural network serves to connect the observed data with the model.

While neural networks can be effective in determining the probabilities for the states of the HMMs of an ASR system, the potentially large number of possible states at each step for which probabilities are needed can nevertheless present practical challenges to implementing HNN/HMMs. For example, taking the number of phonemes in the English language to be 40 (the exact number may vary depending on specific phoneme definitions, for example), approximately $40^3$=64,000 triphones could be defined. Considering three acoustic phases per triphone, that gives 192,000 states. This number can be reduced by clustering triphones according to similar acoustic properties. For example, clustering reduces the number of states for which probabilities need to be determined to approximately 8,000 per time step. This is still a large enough number to pose practical challenges for neural networks. Accordingly, there is a need for approaches to improve the efficiency and effectiveness of using neural networks in HMM-based ASR systems.

In example embodiments, a neural network may, during a single time step, determine probabilities for states of HMMs for multiple feature vectors corresponding to multiple frame times. More particularly, feature vectors may be derived from processing of an audio input signal on a frame-by-frame basis according to conventional operation, as described above. However, in contrast to conventional operation in which state probabilities are determined for only one frame time step for each input of one or more feature vectors to the neural network, the neural network in example embodiments may determine state probabilities for multiple frame time steps corresponding to up to all of multiple feature vectors of a sequence input to the neural network at a single time step. The output of the neural network will then be state probabilities for a sequence of multiple, frame time steps, all based on input at a single frame time step, and all determined by the neural network from the input at that single time step. The state probabilities for the multiple time steps may be applied concurrently to the HMMs associated with each of the corresponding multiple times steps, and the most probable state sequences determined.

In example embodiments, the neural network can determine state probabilities for multiple frames at each input time step, and each new input time step is a multiple number of frame time steps past the previous input time step, as described above. Functioning in this manner to determine state probabilities for multiple frames at each input time step, the neural network may ultimately determine the state probabilities for the same number of frame time steps as in conventional operation. However, the neural network can more efficiently and/or more rapidly determine the state probabilities on a multi-frame basis and at multi-frame input time steps than it can on a single frame basis at single frame input times. As a result, example embodiments can save on processing time, enabling implementation of larger neural networks.

2. Example Method

In example embodiments, an ASR system may include one or more processors, one or more forms of memory, one or more input devices/interfaces, one or more output devices/interfaces, and machine-readable instructions that when executed by the one or more processors cause the ASR system to carry out the various functions and tasks described herein. In particular, the functions and tasks may form a basis for a method for multi-frame prediction for HNN/HMMs. An example of such a method is described in the current section.

FIG. 1 is a flowchart illustrating an example method in accordance with an example embodiment. At step 102 the system transforms an audio input signal into a first time sequence of feature vectors corresponding to a first sequence of temporal frames of the audio input signal. Each temporal frame could contain a portion of the audio input signal digitally sampled within a sliding time window. Each feature vector could include quantitative measures of acoustic properties of the digitally sampled signal within the corresponding time frame.

By way of example, the feature vectors could include Mel Filter Cepstral Coefficients (MFCC), as described below. Other possible types of quantitative measures of acoustic properties could include Perceptual Linear Predictive (PLP) coefficients, Relative Spectral (RASTA) coefficients, and Filterbank log-energy coefficients. Techniques for determining these types of quantitative measures from sampled speech are generally known. It will be appreciated that feature vectors may not necessarily be restricted to including only one of these (or other) types of quantitative measures, but could also include more than one type.

At step 104, the first time sequence of feature vectors is provided as input to a neural network (NN). In accordance with the example embodiment, all of the feature vectors in the first sequence could be provided concurrently at a first time step. That is, while the feature vectors may be generated in time-sequential fashion, they can be provided to the NN at the same time. For example, the feature vectors could arrive at an input buffer of the NN in time-sequential fashion, and then be provided from the buffer once they are all present (e.g., at the first time step).

At step 106, the provided feature vectors in the first time sequence are processed concurrently by the NN in order to determine for each feature vector a respective set of emission probabilities for a first plurality of hidden Markov models (HMMs). Thus, there are as many sets of emission probabilities as feature vectors in the first time sequence. Moreover, all of the sets of emission probabilities (one respective set per feature vector) may be determined at the first time step. For example, the feature vectors in the first time sequence could be processed in parallel by the NN in order to determine in parallel the emission probabilities of the respective sets.

Finally, at step 108, the emission probabilities the respective sets are applied to the HMMs of the first plurality in order to determine speech content corresponding to the first sequence of temporal frames of the audio input signal. In accordance with example embodiments, the HMMs of the first plurality may model probable sequences of states for each feature vector of the first time sequence. The emission probabilities in each respective set may thus be applied to a respective HMM to model a feature vector. The speech content of the temporal frames may be thereby determined concurrently.

In accordance with example embodiments, the method steps 102-108 could be repeated for a second time sequence of feature vectors that follows the first time sequence of feature vectors. More specifically, a second time sequence of feature vectors, corresponding to a second sequence of temporal frames of the audio input signal, could be provided as input to the NN at a second time step that follows the first time step by a multiple number of temporal frame periods. The second time sequence of feature vectors could then be concurrently processed by the NN in order to concurrently determine, at the second time step, for each feature vector a respective set of emission probabilities for a second plurality of HMMs. Finally, the emission probabilities determined at the second time step could be applied to the HMMs of the second plurality in order to determine speech content corresponding to the second sequence of temporal frames of the audio input signal. In a similar manner, the method steps could be repeated again for a third time sequence of feature vectors, corresponding to third sequence of temporal frames, and so on.

In keeping with the terminology introduced above in connection with "HMMs" and "HMM states," each "HMM" of the first plurality of HMMs may be considered a respective grouping of HMM states (e.g., three states) for modeling a portion of speech (e.g., phoneme, triphone, etc.), and the "first plurality of HMMs" may be considered as including multiple respective groupings of HMM states. Similarly, the "second plurality of HMMs" may also be considered as including multiple respective groupings of HMM states, although not necessarily the same respective groupings of HMM states as the first plurality.

In further accordance with example embodiments, the first and second pluralities of HMMs could be the same, different, or have an overlap of at least one common HMM. This is because, to the extent that the second sequence of temporal frames follows the first, the respective acoustic properties of each sequence of temporal frames, as carried in the corresponding time sequences of feature vectors, may represent a smooth evolution of speech (or other audio content). It may therefore occur that at least some of the HMMs of the first plurality, which model the feature vectors of the first time sequence, could also model some of the feature vectors of the second time sequence.

While the example method employs both a neural network (NN) and various pluralities of HMMs, it will be appreciated that the NN and the HMMs could themselves be implemented in more than one way, and in more than one configuration of processing devices and/or platforms. For example, the NN could be implemented on a first group of one or more processors, while the HMMs could be implemented on a second group of one or more processors. Moreover, the first group could be the same or different than the second group, or the first and second groups could include one or more common processors. In addition, the algorithmic implementation of the NN and/or the HMMs could be considered part of the example method, or could be ancillary to it, being provided as separate algorithmic components, for example.

In accordance with example embodiments, the first time sequence of feature vectors could include one or more additional, preceding feature vectors corresponding to one or more temporal frames that temporally precede the first sequence of periodic temporal frames. The first time sequence of feature vectors could also include one or more additional, following feature vectors corresponding to one or more temporal frames that temporally follow the first sequence of periodic temporal frames. These preceding and following temporal frames could provide preceding and following temporal context for the first sequence of periodic temporal frames, and the corresponding preceding and following feature vectors can provide preceding and following context for the first time sequence of feature vectors. In further accordance with example embodiments, the first time sequence of feature vectors, together with preceding and following feature vectors can be concurrently received at the input of the neural network.

In an ASR system, the first plurality of HMMs could collectively include a multiplicity of states. Then, in accordance with example embodiments, determining, at the first time step, the respective sets of emission probabilities for the first plurality of HMMs could include determining a conditional probability for each feature vector of the first time sequence and for each state of the multiplicity. More specifically, the emission probability for each respective feature vector of the first time sequence and each respective state of the multiplicity corresponds to the conditional probability that the respective feature vector will be "emitted" given the respective state. As will be described below, the emission probability is a prior probability derived from a posterior probability generated by the NN. Each emission probability determined in this manner is then counted among one of respective sets of emission probabilities.

In further accordance with example embodiments, determining the speech content of the first sequence of temporal frames of the audio input signal could correspond to determining a probable sequence of elemental speech units based on a most likely sequence of states of the multiplicity. More particularly, the HMMs of the first plurality may each be respectively associated with a respective elemental speech unit, and moreover may each have one or more states corresponding to one or more temporal phases of the associated, respective elemental speech unit. For example, the elemental speech units could be phonemes, triphones, quinphones, or other fundamental components of speech. The multiplicity of states of the first plurality of HMMs may therefore correspond to a collection of the one or more states of the HMMs. A most likely sequence of states of the multiplicity may therefore correspond to a most likely sequence of elemental speech units, and thereby yield the speech (or other audio) content of the first sequence of temporal frames.

In accordance with example embodiments, determining speech content of the first sequence of temporal frames of the audio input signal could include carrying out one or more actions based on the determined speech content. For example, the action could be generating and outputting a text string corresponding to the determined speech content. In this case, the ASR system could function as a speech-to-text system or program. As another example, the action could be to identify the determined speech content with a computer-executable command, and to causes an application or program associated with the command to be executed. Other actions are possible as well.

It will be appreciated that the steps shown in FIG. 1 are meant to illustrate a method in accordance with an example embodiment. As such, various steps could be altered or modified, the ordering of certain steps could be changed, and additional steps could be added, while still achieving the overall desired operation.

3. Example Communication System and Device Architecture

Methods in accordance with an example embodiment, such as the on described above, devices, could be implemented using so-called "thin clients" and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

a. Example Communication System

Figure 2:
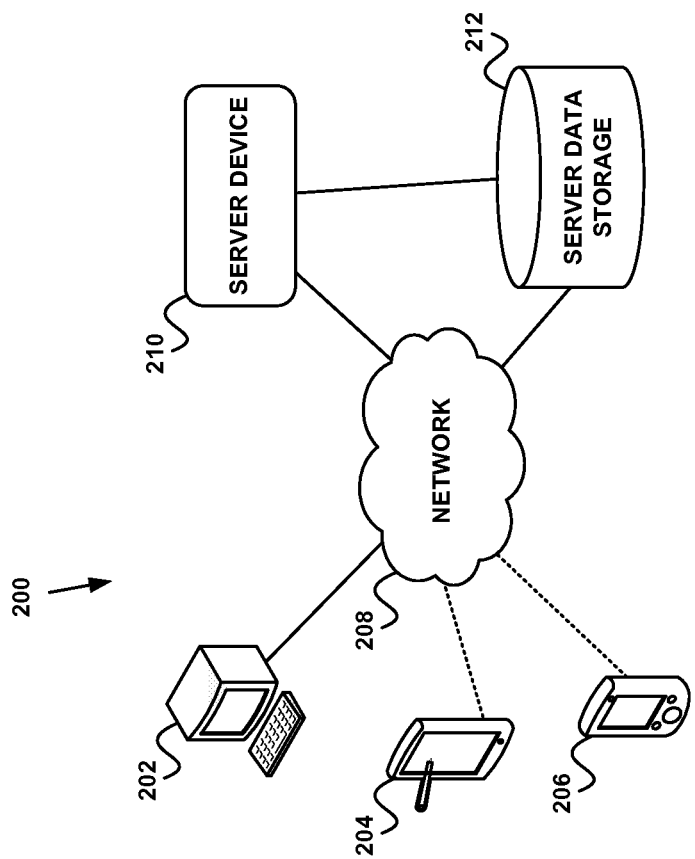
FIG. 2 is a block diagram of an example network and computing architecture, in accordance with an example embodiment.

FIG. 2 is a simplified block diagram of a communication system 200, in which various embodiments described herein can be employed. Communication system 200 includes client devices 202, 204, and 206, which represent a desktop personal computer (PC), a tablet computer, and a mobile phone, respectively. Client devices could also include wearable computing devices, such as head-mounted displays and/or augmented reality displays, for example. Each of these client devices may be able to communicate with other devices (including with each other) via a network 208 through the use of wireline connections (designated by solid lines) and/or wireless connections (designated by dashed lines).

Network 208 may be, for example, the Internet, or some other form of public or private Internet Protocol (IP) network. Thus, client devices 202, 204, and 206 may communicate using packet-switching technologies. Nonetheless, network 208 may also incorporate at least some circuit-switching technologies, and client devices 202, 204, and 206 may communicate via circuit switching alternatively or in addition to packet switching.

A server device 210 may also communicate via network 208. In particular, server device 210 may communicate with client devices 202, 204, and 206 according to one or more network protocols and/or application-level protocols to facilitate the use of network-based or cloud-based computing on these client devices. Server device 210 may include integrated data storage (e.g., memory, disk drives, etc.) and may also be able to access a separate server data storage 212. Communication between server device 210 and server data storage 212 may be direct, via network 208, or both direct and via network 208 as illustrated in FIG. 2. Server data storage 212 may store application data that is used to facilitate the operations of applications performed by client devices 202, 204, and 206 and server device 210.

Although only three client devices, one server device, and one server data storage are shown in FIG. 2, communication system 200 may include any number of each of these components. For instance, communication system 200 may comprise millions of client devices, thousands of server devices and/or thousands of server data storages. Furthermore, client devices may take on forms other than those in FIG. 2.

b. Example Server Device and Server System

Figure 3A:
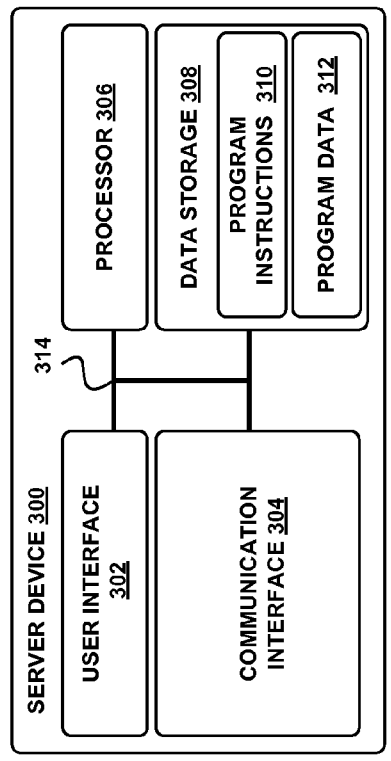
FIG. 3A is a block diagram of a server device, in accordance with an example embodiment.

FIG. 3A is a block diagram of a server device in accordance with an example embodiment. In particular, server device 300 shown in FIG. 3A can be configured to perform one or more functions of server device 210 and/or server data storage 212. Server device 300 may include a user interface 302, a communication interface 304, processor 306, and data storage 308, all of which may be linked together via a system bus, network, or other connection mechanism 314.

User interface 302 may comprise user input devices such as a keyboard, a keypad, a touch screen, a computer mouse, a track ball, a joystick, and/or other similar devices, now known or later developed. User interface 302 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 302 may be configured to generate audible output(s), via a speaker, speaker jack, audio output port, audio output device, earphones, and/or other similar devices, now known or later developed. In some embodiments, user interface 302 may include software, circuitry, or another form of logic that can transmit data to and/or receive data from external user input/output devices.

Communication interface 304 may include one or more wireless interfaces and/or wireline interfaces that are configurable to communicate via a network, such as network 208 shown in FIG. 2. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 304 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 306 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 306 may be configured to execute computer-readable program instructions 310 that are contained in data storage 308, and/or other instructions, to carry out various functions described herein.

Data storage 308 may include one or more non-transitory computer-readable storage media that can be read or accessed by processor 306. The one or more computer-readable storage media may include volatile and/or non-volatile storage components, such as optical, magnetic, organic or other memory or disc storage, which can be integrated in whole or in part with processor 306. In some embodiments, data storage 308 may be implemented using a single physical device (e.g., one optical, magnetic, organic or other memory or disc storage unit), while in other embodiments, data storage 308 may be implemented using two or more physical devices.

Data storage 308 may also include program data 312 that can be used by processor 306 to carry out functions described herein. In some embodiments, data storage 308 may include, or have access to, additional data storage components or devices (e.g., cluster data storages described below).

Referring again briefly to FIG. 2, server device 210 and server data storage device 212 may store applications and application data at one or more locales accessible via network 208. These locales may be data centers containing numerous servers and storage devices. The exact physical location, connectivity, and configuration of server device 210 and server data storage device 212 may be unknown and/or unimportant to client devices. Accordingly, server device 210 and server data storage device 212 may be referred to as "cloud-based" devices that are housed at various remote locations. One possible advantage of such "cloud-based" computing is to offload processing and data storage from client devices, thereby simplifying the design and requirements of these client devices.

In some embodiments, server device 210 and server data storage device 212 may be a single computing device residing in a single data center. In other embodiments, server device 210 and server data storage device 212 may include multiple computing devices in a data center, or even multiple computing devices in multiple data centers, where the data centers are located in diverse geographic locations. For example, FIG. 2 depicts each of server device 210 and server data storage device 212 potentially residing in a different physical location.

Figure 3B:
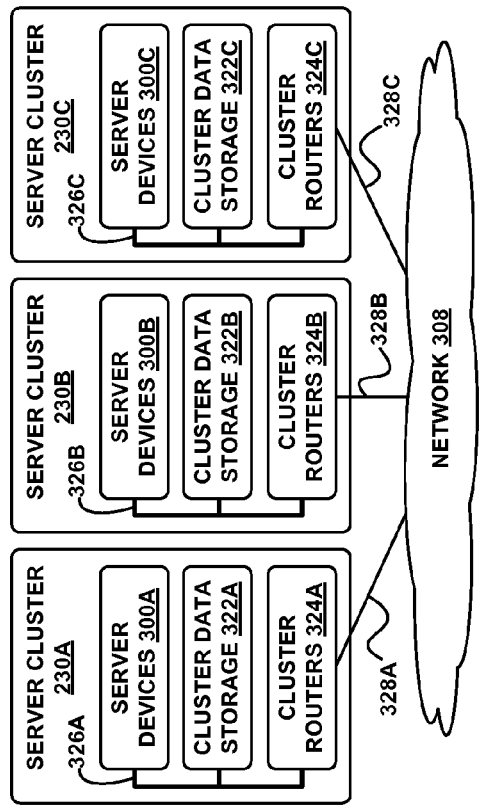
FIG. 3B depicts a cloud-based server system, in accordance with an example embodiment.

FIG. 3B depicts an example of a cloud-based server cluster. In FIG. 3B, functions of server device 210 and server data storage device 212 may be distributed among three server clusters 320A, 320B, and 320C. Server cluster 320A may include one or more server devices 300A, cluster data storage 322A, and cluster routers 324A connected by a local cluster network 326A. Similarly, server cluster 320B may include one or more server devices 300B, cluster data storage 322B, and cluster routers 324B connected by a local cluster network 326B. Likewise, server cluster 320C may include one or more server devices 300C, cluster data storage 322C, and cluster routers 324C connected by a local cluster network 326C. Server clusters 320A, 320B, and 320C may communicate with network 308 via communication links 328A, 328B, and 328C, respectively.

In some embodiments, each of the server clusters 320A, 320B, and 320C may have an equal number of server devices, an equal number of cluster data storages, and an equal number of cluster routers. In other embodiments, however, some or all of the server clusters 320A, 320B, and 320C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 320A, for example, server devices 300A can be configured to perform various computing tasks of a server, such as server device 210. In one embodiment, these computing tasks can be distributed among one or more of server devices 300A. Server devices 300B and 300C in server clusters 320B and 320C may be configured the same or similarly to server devices 300A in server cluster 320A. On the other hand, in some embodiments, server devices 300A, 300B, and 300C each may be configured to perform different functions. For example, server devices 300A may be configured to perform one or more functions of server device 210, and server devices 300B and server device 300C may be configured to perform functions of one or more other server devices. Similarly, the functions of server data storage device 212 can be dedicated to a single server cluster, or spread across multiple server clusters.

Cluster data storages 322A, 322B, and 322C of the server clusters 320A, 320B, and 320C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 210 and server data storage device 212 can be distributed across server clusters 320A, 320B, and 320C, various active portions and/or backup/redundant portions of these components can be distributed across cluster data storages 322A, 322B, and 322C. For example, some cluster data storages 322A, 322B, and 322C may be configured to store backup versions of data stored in other cluster data storages 322A, 322B, and 322C.

Cluster routers 324A, 324B, and 324C in server clusters 320A, 320B, and 320C, respectively, may include networking equipment configured to provide internal and external communications for the server clusters. For example, cluster routers 324A in server cluster 320A may include one or more packet-switching and/or routing devices configured to provide (i) network communications between server devices 300A and cluster data storage 322A via cluster network 326A, and/or (ii) network communications between the server cluster 320A and other devices via communication link 328A to network 308. Cluster routers 324B and 324C may include network equipment similar to cluster routers 324A, and cluster routers 324B and 324C may perform networking functions for server clusters 320B and 320C that cluster routers 324A perform for server cluster 320A.

Additionally, the configuration of cluster routers 324A, 324B, and 324C can be based at least in part on the data communication requirements of the server devices and cluster storage arrays, the data communications capabilities of the network equipment in the cluster routers 324A, 324B, and 324C, the latency and throughput of the local cluster networks 326A, 326B, 326C, the latency, throughput, and cost of the wide area network connections 328A, 328B, and 328C, and/or other factors that may contribute to the cost, speed, fault-tolerance, resiliency, efficiency and/or other design goals of the system architecture.

c. Example Client Device

Figure 4:
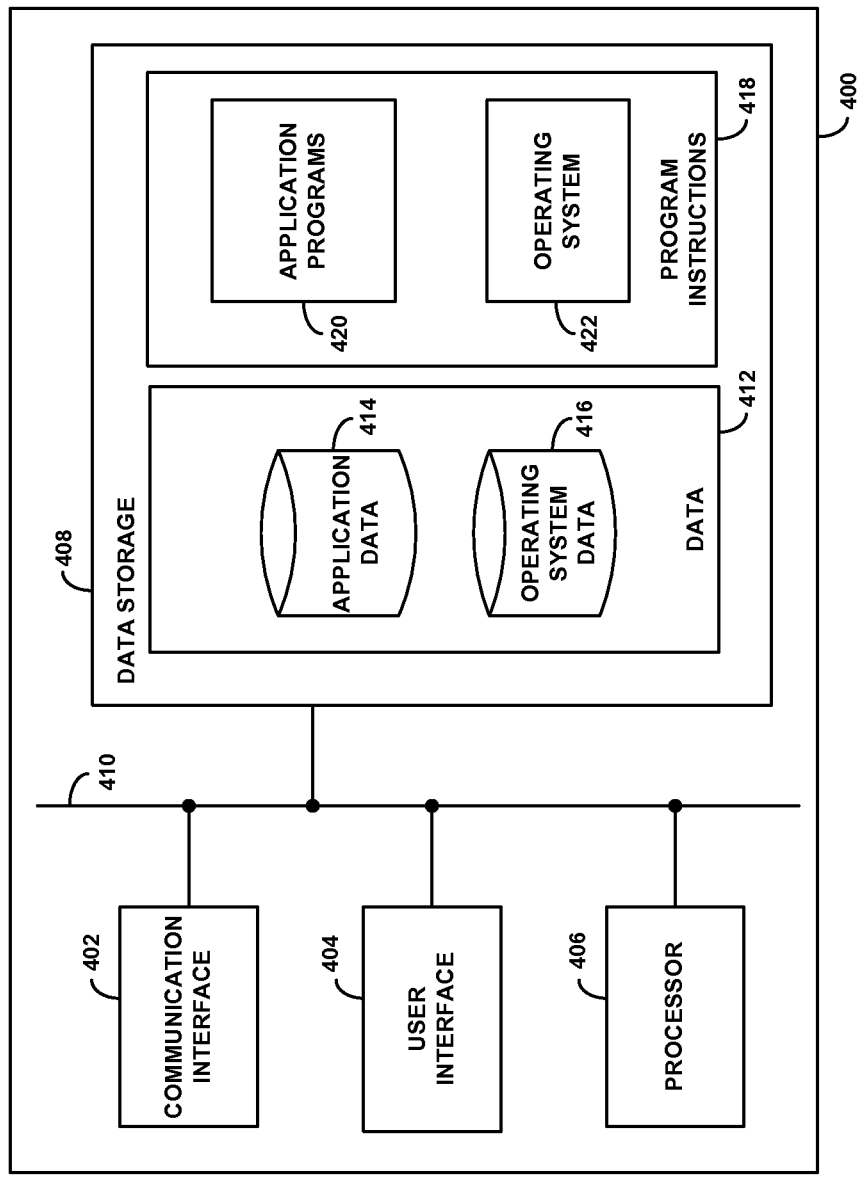
FIG. 4 depicts a block diagram of a client device, in accordance with an example embodiment.

FIG. 4 is a simplified block diagram showing some of the components of an example client device 400. By way of example and without limitation, client device 400 may be or include a "plain old telephone system" (POTS) telephone, a cellular mobile telephone, a still camera, a video camera, a fax machine, an answering machine, a computer (such as a desktop, notebook, or tablet computer), a personal digital assistant (PDA), a wearable computing device, a home automation component, a digital video recorder (DVR), a digital TV, a remote control, or some other type of device equipped with one or more wireless or wired communication interfaces.

As shown in FIG. 4, client device 400 may include a communication interface 402, a user interface 404, a processor 406, and data storage 408, all of which may be communicatively linked together by a system bus, network, or other connection mechanism 410.

Communication interface 402 functions to allow client device 400 to communicate, using analog or digital modulation, with other devices, access networks, and/or transport networks. Thus, communication interface 402 may facilitate circuit-switched and/or packet-switched communication, such as POTS communication and/or IP or other packetized communication. For instance, communication interface 402 may include a chipset and antenna arranged for wireless communication with a radio access network or an access point. Also, communication interface 402 may take the form of a wireline interface, such as an Ethernet, Token Ring, or USB port. Communication interface 402 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

User interface 404 may function to allow client device 400 to interact with a human or non-human user, such as to receive input from a user and to provide output to the user. Thus, user interface 404 may include input components such as a keypad, keyboard, touch-sensitive or presence-sensitive panel, computer mouse, trackball, joystick, microphone, still camera and/or video camera. User interface 404 may also include one or more output components such as a display screen (which, for example, may be combined with a touch-sensitive panel), CRT, LCD, LED, a display using DLP technology, printer, light bulb, and/or other similar devices, now known or later developed. User interface 404 may also be configured to generate audible output(s), via a speaker, speaker jack, audio output port, audio output device, earphones, and/or other similar devices, now known or later developed. In some embodiments, user interface 404 may include software, circuitry, or another form of logic that can transmit data to and/or receive data from external user input/output devices. Additionally or alternatively, client device 400 may support remote access from another device, via communication interface 402 or via another physical interface (not shown).

Processor 406 may comprise one or more general purpose processors (e.g., microprocessors) and/or one or more special purpose processors (e.g., DSPs, GPUs, FPUs, network processors, or ASICs). Data storage 408 may include one or more volatile and/or non-volatile storage components, such as magnetic, optical, flash, or organic storage, and may be integrated in whole or in part with processor 406. Data storage 408 may include removable and/or non-removable components.

In general, processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by client device 400, cause client device 400 to carry out any of the methods, processes, or functions disclosed in this specification and/or the accompanying drawings. The execution of program instructions 418 by processor 406 may result in processor 406 using data 412.

By way of example, program instructions 418 may include an operating system 422 (e.g., an operating system kernel, device driver(s), and/or other modules) and one or more application programs 420 (e.g., address book, email, web browsing, social networking, and/or gaming applications) installed on client device 400. Similarly, data 412 may include operating system data 416 and application data 414. Operating system data 416 may be accessible primarily to operating system 422, and application data 414 may be accessible primarily to one or more of application programs 420. Application data 414 may be arranged in a file system that is visible to or hidden from a user of client device 400.

Application programs 420 may communicate with operating system 412 through one or more application programming interfaces (APIs). These APIs may facilitate, for instance, application programs 420 reading and/or writing application data 414, transmitting or receiving information via communication interface 402, receiving or displaying information on user interface 404, and so on.

In some vernaculars, application programs 420 may be referred to as "apps" for short. Additionally, application programs 420 may be downloadable to client device 400 through one or more online application stores or application markets. However, application programs can also be installed on client device 400 in other ways, such as via a web browser or through a physical interface (e.g., a USB port) on client device 400.

4. Example System and Operation a. Example Automatic Speech Recognition System

Figure 5:
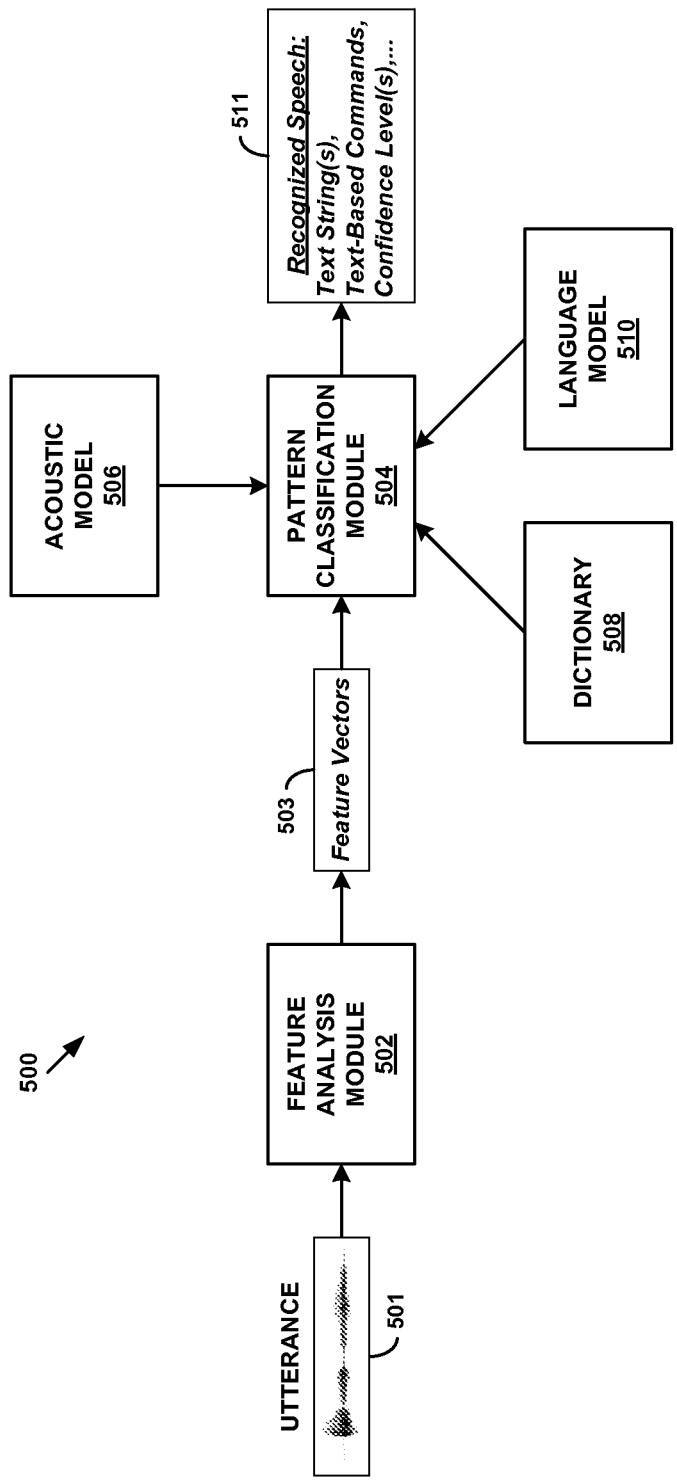
FIG. 5 depicts a block diagram of an ASR system, in accordance with an example embodiment.

FIG. 5 depicts a block diagram of an example ASR system 500 in which an example embodiment of multi-frame prediction could be carried out. In addition to functional components, FIG. 5 also shows selected example inputs, outputs, and intermediate products of example operation. The functional components of the ASR system 500 include a feature analysis module 502, a pattern classification module 504, an acoustic model 506, a dictionary 508, and a language model 510. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

It should be noted that the discussion in this section, and the accompanying figures, are presented for purposes of example. Other ASR system arrangements, including different components, different relationships between the components, and/or different processing, may be possible.

At run-time, an audio signal bearing an utterance 501 may be input to the ASR system 500, whereupon the system may generate an output 511 that could include recognized speech in the form of one or more text strings and possibly associated confidence levels. The output could also take the form of a computer-executable action or command identified or associated with the recognized speech (or other audio) content of the input utterance 501.

In some examples, the utterance 501 could include an analog or digital representation of human speech, such as a spoken word, multiple words, a phrase, multiple phrases, a sentence, multiple sentences, or other segment of speech, for example. Although not explicitly shown in the figure, the source of the utterance 501 could be a live person speaking in real time into a microphone, telephone, or other audio input/transmission device/system, that then produces and supplies the audio signal as input to the ASR system 500. The audio input/transmission device/system, also not explicitly shown in FIG. 5, could, by way of example, be a client device, such as the ones described above. Additionally or alternatively, an audio input/transmission device/system could be integrated as part of the ASR system 500. The source of the spoken utterance could also be previously-recorded speech that is played out via an audio output device/system, for example, and supplied as the audio input signal to the ASR system.

As shown in the FIG. 5, the utterance 501 may be received at the analysis module 502, which may convert utterance 501 into a sequence of one or more feature vectors 503. The conversion of the utterance 501 into the feature vectors 503 is sometimes referred to as feature extraction. As described below, each of feature vectors 503 may include temporal and/or spectral representations of the acoustic features of at least a portion of utterance 501.

Following feature extraction, the feature vectors 503 may be input to the pattern classification module 504, which may produce the output 511. By way of example, the output 511 could be one or more text string transcriptions of utterance 501. Each transcription may be accompanied by a respective confidence level indicating an estimated likelihood that the transcription is correct (e.g., 80% confidence, 90% confidence, etc.). The output 511 could also take the form of an executable application or command determined based on the recognize speech content of the utterance 501.

To produce the output 511, pattern classification module 504 may bring together and/or incorporate functionality of the acoustic model 506, the dictionary 508, and the language model 510. The acoustic model 506 is used to model the observed data, as represented in the feature vectors 503, subject to guidance and constraints supplied by the dictionary 508 and the language model 510. The modeling process determines probabilities that a particular sequence of feature vectors 503 were derived from particular sequences of spoken sub-word sounds. Modeling may also involve probabilistic mapping of sequences of feature vectors to one or more fundamental speech units (e.g., phonemes) from among a stored corpus of fundamental speech units. The acoustic model 506 is discussed in more detail below.

In a manner similar to that of the acoustic model 506, the language model 510 may assign probabilities to sequences of phonemes or words, based on the likelihood of a sequence of phonemes or words occurring in an input utterance to the ASR system. Thus, for example, language model 510 may define the conditional probability of $w_n$ (the nth word in a phrase transcribed from an utterance), given the values of the pattern of n−1 previous words in the phrase. This conditional probability can be expressed formally as $P(w_n|w_1, w_2, \ldots, w_{n-1})$.

Consideration of certain aspects of the example ASR system 500 in more detail may be useful to further understanding example embodiments. In practice, the feature analysis module 502 may sample and quantize utterance 501 within a time sequence of overlapping or non-overlapping temporal frames, and perform spectral analysis on the frames to derive a feature vector associated with each frame. For example, each frame could be acquired in a sliding time window that is periodically advanced. Each advance of the time window could be in increments measured in fractional units of the width of the time window. By way of example, the width of each frame (and of the sliding time window) could be 25 milliseconds (ms), and the time increment between each frame acquisition could be 10 ms. With this configuration, each new 25 ms frame would advance by 10 ms past the end of the previous frame, and the first 15 ms of each new 25 ms frame would overlap with the last 15 ms of the previous frame. Thus, every two consecutive frames would contain 15 ms of common audio data (e.g. of an utterance). Other frame sizes, window sizes, and time increment sizes could be used as well.

Feature extraction produces a feature vector for each frame of sampled audio data (e.g. of the utterance 501). By way of example, each feature vector may include Mel Filter Cepstral Coefficients (MFCCs) of each frame of the utterance 501, as determined by the feature analysis module 502. MFCCs may represent the short-term power spectrum of a portion of utterance 501, and may be based on, for example, a linear cosine transform of a log power spectrum on a nonlinear Mel scale of frequency. (A Mel scale may be a scale of pitches subjectively perceived by listeners to be about equally distant from one another, even though the actual frequencies of these pitches are not equally distant from one another.) The feature analysis module 502 may further perform noise removal and convert the standard spectral coefficients to MFCCs, and then calculate first-order and second-order cepstral derivatives of the MFCCs.

The first-order cepstral coefficient derivatives may be calculated based on the slopes of linear regressions performed over windows of two or more consecutive frames. The second-order cepstral coefficient derivatives may be calculated based on the slopes of linear regressions performed over windows of two or more consecutive sets of first-order cepstral coefficient derivatives. However, there may be other ways of calculating the first-order and second-order cepstral coefficient derivatives.

In some embodiments, one or more frames of utterance 501 may be represented by a feature vector of MFCCs, first-order cepstral coefficient derivatives, and second-order cepstral coefficient derivatives. For example, the feature vector may contain 13 coefficients, 13 first-order derivatives, and 13 second-order derivatives, therefore having a length of 39. However, feature vectors may use different combinations of features in other possible embodiments. As another example, feature vectors could include Perceptual Linear Predictive (PLP) coefficients, Relative Spectral (RASTA) coefficients, Filterbank log-energy coefficients, or some combination thereof. Each feature vector may be thought of as including a quantified characterization of the acoustic content of a corresponding temporal frame of the utterance 501 (or more generally of an audio input signal).

The corpus applied in the modeling procedure may include a large collection of stored speech samples that have been digitally processed, deconstructed, and categorized into a set of fundamental units corresponding to speech sounds, such as phonemes. The corpus may also include a set of units corresponding to larger speech segments (e.g., words, phrases, etc.). The fundamental units may also have associated "tags" or labels that can be used to identify them for purposes of generating text or other output from strings or sequences of units, for example.

As discussed above, a fundamental unit of speech that is suitable for use in the modeling procedure is a phoneme. A phoneme may be considered to be the smallest segment of an utterance that encompasses a meaningful contrast with other segments of utterances. Thus, a word typically includes one or more phonemes. For purposes of simplicity, phonemes may be thought of as utterances of letters, although this is not a perfect analogy, as some phonemes may present multiple letters. As an example, the phonemic spelling for the American English pronunciation of the word "cat" is /k/ /ae/ /t/, and consists of the phonemes /k/, /ae/, and /t/. Another example is the phonemic spelling for the word "dog" is /d/ /aw/ /g/, consisting of the phonemes /d/, /aw/, and /g/. Different phonemic alphabets exist, and other phonemic representations are possible. Common phonemic alphabets for American English contain about 40 distinct phonemes. Each of these phonemes can be represented in a quantifiable form as a distribution of feature vector values.

In the context of typical speech, phonemes frequently occur in triplet combinations referred to as triphones, whereby a given phoneme appears in the context of a preceding phoneme and a following (subsequent) phoneme. By convention, the preceding phoneme is called the "left context" and the following (subsequent) phoneme is called the "right context."Thus, the ordering of the phonemes of a triphone corresponds to the direction in which English is read.

Triphones capture how acoustic properties of a phoneme can depend on what precedes and follows it in a particular, spoken word. As an example, the word "dad" when spoken could be considered to be constructed of phoneme sequence [d], [ae], and [d], where the brackets (In identify the particular phoneme being spoken, and the forward-slash ("/") notation has been dropped for the sake of brevity. In isolation (or following a pause after a preceding word, for example), the first triphone of "dad" would be "#[d]ae." The left-context phoneme "#" signifies the start of the first [d] phoneme with nothing (e.g., a pause) preceding it (e.g, silence), and the right-context phoneme "ae" signifies the a-sound (as in "dad") following it. Both the left and right contexts influence how the [d] phoneme is rendered acoustically. The next triphone would be "d[ae]d," in which the acoustic properties of the [ae] phoneme are influenced by the both the left-context (preceding) phoneme "d" and the right-context (following) phoneme "d." Finally, the last triphone would be be "ae[d]#," in which the acoustic properties of the final [d] phoneme are influenced by the both the left-context (preceding) phoneme "ae" and the right-context (following) phoneme "#" that signifies the end of the word (e.g., no further sound).

b. Example Hybrid Neural Network/Hidden Markov Model Implementation

In accordance with example embodiments, the acoustic model 506 may be implemented in the form of, or may include, a hybrid configuration of a neural network (NN) and one or more hidden Markov models (HMMs). Such an implementation is referred to herein as a hybrid neural network/hidden Markov model, and is abbreviated as HNN/HMM (or HNN/HMMs in reference to a plural HMMs). In a HNN/HMM implementation, one or more HMMs are used to model the fundamental speech units (e.g., phonemes, triphones, etc.), while the neural network is used to determine certain probabilities to apply to the models, based on the observed data (i.e., sequence of feature vectors 503 in the example ASR system 500). For purposes of the discussion herein, the fundamental speech units of HMMs will be taken to be triphones, since this is the case in practice for certain ASR systems. It will be appreciated, however, that the principles discussed is not limited to triphones, and that other fundamental speech units can be used (e.g. phonemes, quinphones, etc.).

As a spoken sound, a triphone may be modeled as temporally evolving according to a sequence of temporal phases. It has been observed empirically, for example, that triphones manifest in speech across three acoustic phases: a start, a middle, and an end. The HMM for a given triphone therefore can be constructed having three states, one corresponding to each acoustic phase. Transitions between states are governed by transition probabilities of the model, and one or more states could include self-transitions that "loop" back to themselves. In addition, each state has an associated "emission probability" for "emitting" an output corresponding to the acoustic phase of the triphone. Thus, the HMM for a given triphone is characterized by probabilities of transitioning from a current state to a next state, and upon transitioning, a respective probability of producing (emitting) the acoustic phase associated with the next state. As described below, the emission probabilities are determined by the neural network, based on the observed utterance as represented in the feature vectors derived from the utterance.

Returning first to the example of the word "dad," the triphone sequence described above could be modeled with three HMM states each. For example, the triphone "#[d]ae" could be modeled according to states corresponding to "#[d]ae.1," "#[d]ae.2," and "#[d]ae.3," where the ".1," ".2," and ".3" signify a temporal order of the states in the HMM for the triphone "#[d]ae." Similarly, the triphone "d[ae]d" could be modeled with a HMM having states corresponding to "d[ae]d.1," "d[ae]d.2," and "d[ae]d.3," and the triphone "ae[d]#" could be modeled with a HMM having states corresponding to "ae[d]#.1," "ae[d]#.2," "ae[d]#.3." This description could be generalized to different number of acoustic phases of triphones (as well as to other phoneme sequences).

Sequential feature vectors 503 derived from the utterance 501 represent a stream of observed acoustic data, while sequential states of one or more concatenated HMMs represent sequences of acoustic phases of triphones in the corpus that probabilistically correspond to the observed acoustic data. While the possible states and their associated transition and emission probabilities of the HMMs may be known, the specific state sequences associated with any given observed sequence of feature vectors is not (hence the term "hidden"). Recognition of speech in the input utterance 501 therefore involves determining the most probable sequence (or sequences) of states of one or more concatenated HMMs that would produce the observed feature vectors 503. The most probable sequence of states then corresponds to the most probable sequence of triphones (including acoustic phases), from which the output 511 can be determined.

In a conventional HNN/HMM implementation, the determination of the most probable sequences of HMMs and states is carried out one step at a time, where each step corresponds to a feature vector in the sequence 503, and by extension to a frame of sampled audio data. The process can be guided at each new step by the results of the previous step, since the most probable state determined for the previous step may constrain the possible (allowed) states that can be transitioned to on the next step. Thus, for each particular feature vector and each allowed next state, the NN determines a conditional probability that the particular feature vector would be emitted given the allowed next state.

More particularly, the NN may be trained before run time to recognize feature vectors as input, and to generate associated conditional probabilities as output. Then, at each time step corresponding to a frame at run time, the NN, based on what it has "learned" during training, generates a posterior conditional probability of being in the particular allowed next state, given the observed run-time feature vector. On the other hand, the emission probability for each particular allowed next state is a prior conditional probability of emitting the observed feature vector, given that the HMM is in the particular allowed next state. The prior conditional probability—i.e., the emission probability—can be related to the posterior conditional probability through Bayes rule.

In specific terms, the NN may be trained to be able to produce, at run time, the posterior conditional probability $p(q_k|x_j)$, corresponding to the a posteriori probability of the HMM state $q_k$ given the acoustic data $x_j$, observed at run time. The index $k=1, \ldots, K$ runs over K allowed next states of concatenated HMMs, while the $x_j$, $j=1, \ldots, S$ may be taken as a feature vector having S acoustic features. As noted, the training of the NN may take place before run time, using training data (e.g., from the corpus). For the HMM states, Bayes rule can be expressed as:

$$\frac{p(x_j \mid q_k)}{p(x_j)} = \frac{p(q_k \mid x_j)}{p(q_k)}, \quad [1]$$

where $p(q_k)$ gives the prior probabilities for the $q_k$ states, and $p(x_j)$ gives the probabilities for the acoustic features. Before run time, the ASR system may also be trained to generate expected output (e.g., text strings) from known input speech (e.g., utterances), from which relative frequencies of the $q_k$, $k=1, \ldots, K$ states, and correspondingly the prior probabilities $p(q_k)$ for the $q_k$ states may be determined. In addition, the probabilities $p(x_j)$ are the same for all states at run time, and so may be treated as a scaling constant in the expression for Bayes rule. It may therefore be seen that the a priori emission probabilities $p(x_j|q_k)$ for the $q_k$, $k=1, \ldots, K$ states follow from Bayes rule (equation [1] above) applied at run time for the HMM states.

Once the emission probabilities for all the allowed next states of a time step are computed, the most probable next state for that time step can be determined as the one that maximizes the combined likelihood of being transitioned to, and emitting the observed feature vector. In this manner, the most probable sequence of states corresponding to a sequence of feature vectors is determined, and from which follows the most probable sequence of fundamental speech units in the corpus and a reconstruction of the utterance in the audio input signal.

One of the aspects of using a neural network for determining the emission probabilities is that correlations among feature vectors are accounted for naturally in the "learning" process during training Consequently, categorization of feature vectors corresponding to the speech samples of the corpus can avoid simplifying assumptions often required by other analysis techniques, such as Gaussian mixture models, to deal with statistical complexities. Moreover, the ability of neural networks to naturally account for correlations among feature vectors also enables determination of the probabilities for a given input feature vector to include input from a subsequence of feature vectors preceding and/or following the given feature vector. Feature vectors preceding and/or following a given feature vector can thereby provide additional context for the neural network.

Figure 6:
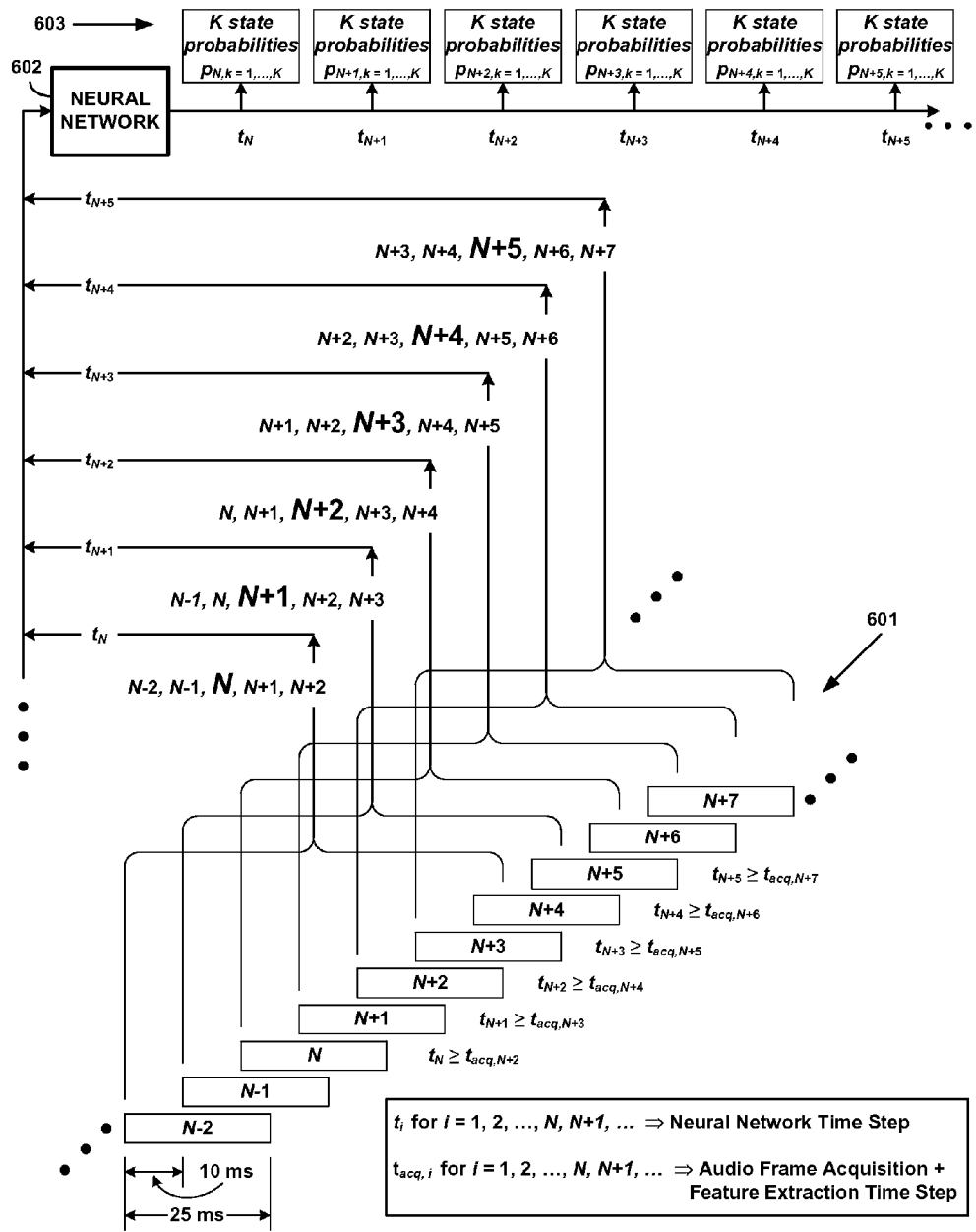
FIG. 6 is a schematic illustration of conventional processing of feature vectors with a neural network to determine emission probabilities for hidden Markov models.

FIG. 6 is a schematic illustration of conventional processing of feature vectors with a neural network to determine emission probabilities for hidden Markov models. In the figure, a time sequence of feature vectors 601 is represented by a "staircase" of overlapping rectangles labeled, by way of example, N−2, N−1, ..., N, N+1, ..., N+7, where each label corresponds to a frame time step at which the input audio data was acquired (e.g., digitally sampled). The representation of the feature vectors 601 as overlapping rectangles is meant as an indication that each feature vector corresponds to a frame of sampled audio input (e.g., an utterance), and that each frame may be acquired in a sliding time window. As illustrated by way of example in FIG. 6, each frame (i.e., the time window) is 25 ms in duration, and the time increment between successive windows is 10 ms. With this configuration, each next frame overlaps the previous frame by 15 ms. The time increment between frames (e.g., 10 ms in the present example) can be referred to as the frame period; the inverse of the frame period can be referred as the frame rate (100 frames per second in the present example).

The feature vectors 601 in FIG. 6 may be the output of sampling and digital processing, such as by the feature analysis module 502 shown in FIG. 5. The frame-like representation of the feature vectors 601 may thus be taken as a visual cue that digital samples of the input utterance 501 may be acquired in time frames using a sliding window, and then subject to feature extraction. In the example operation illustrated in FIG. 6, each frame of audio data may be acquired (e.g., digitally sampled) at an "acquisition time" $t_{ack,i}$, $i=1, 2, \ldots, N, N+1, \ldots$. For purposes of the present discussion, $t_{ack,i}$ may also be considered the time at which feature extraction is performed, although this is not necessarily a restriction of embodiments described herein.

Each feature vector of the sequence 601 may then be presented as input to a neural network 602 for processing at a respective "neural network time step" $t_i$, $i=1, 2, \ldots, N, N+1$, Note that the $t_i$ may not necessarily be equal to $t_{ack,i}$, for a given value of i=N. As explained below, for example, the input to the neural network 602 at $t_{i=N}$ may include a feature vector corresponding to a frame acquired at $t_{ack,i-N}$, as well as one or more feature vectors corresponding to frames acquired at times after (and possibly before) $t_{ack,i=N}$. In this case, $t_{i=N} \geqq t_{ack,i=N}$ where m is the number of additional feature vectors (and frames) following frame N. For the illustration in FIG. 6, each feature vector input to the neural network 602 includes feature vectors corresponding to two subsequent (and two preceding) frames; hence $t_{i=N} \geqq t_{ack,i=N+2}$ for each value of N, as indicated for this example. The legend at lower right of FIG. 6 reiterates the meanings of $t_i$ and $t_{ack,i}$.

By way of example in FIG. 6, feature vectors corresponding to frame times $t_{ack,N}$, $t_{ack,N+1}$, ... $t_{ack,N+5}$ (and labeled N, N+1, ..., N+5) are shown at being input to the neural network at neural network time steps $t_N$, $t_{N+1}$, ..., $t_{N+5}$. At each neural network time step, each feature vector is shown as being "accompanied" by two preceding and two following feature vectors corresponding to preceding and following frame acquisition times.

For example, the input to the neural network 602 at neural network time step $t_N$ includes the feature vector labeled N, together with feature vectors labeled N−2, N−1, N+1, and N+2, corresponding to frame acquisition times $t_{ack,N-2}$, $t_{ack,N-1}$, $t_{ack,N}$, $t_{ack,N+1}$, and $t_{ack,N+2}$. Similarly, the input to the neural network 602 at neural network time step $t_{N+1}$ includes the feature vector labeled N+1, together with feature vectors labeled N−1, N, N+2, and N+3, corresponding to frame acquisition times $t_{ack,N-1}$, $t_{ack,N}$, $t_{ack,N+1}$, $t_{ack,N+2}$, and $t_{ack,N+3}$. This pattern in extended in the figure up to neural network time step $t_{N+5}$ for the feature vector labeled N+5, together with feature vectors labeled N+3, N+4, N+6, and N+7, corresponding to frame acquisition times $t_{ack,N+3}$, $t_{ack,N+4}$, $t_{ack,N+5}$, $t_{ack,N+6}$ and $t_{ack,N+7}$ will be appreciated that other arrangements of multiple feature vector input could be used. For instance, each feature vector could be accompanied by four preceding and four following feature vectors. In addition, the number of preceding and following feature vectors need not be equal.

In a conventional HNN/HMM implementation, the neural network 602 may generate at each neural network time step $t_i$, i=1, 2, ..., N, N+1, ..., a set of K emission probabilities $p(x_j|q_k)$ for $q_k$, k=1, ..., K HMM states according, for example, to equation [1]. As such, the neural network 602 may be considered as operating at the input frame rate. In FIG. 6, for example, a set of K emission probabilities 603 is generated at each of neural network time steps $t_N$, $t_{N+1}$, $t_{N+2}$, $t_{N+4}$, and $t_{N+5}$. The emission probabilities 603, designated "K state probabilities" in this example, are labeled $p_{N,k=1,...,K}$ at $t_N$, $p_{N+1,k=1,...,K}$ at $t_{N+1}$; $p_{N+2,k=1,...,K}$ at $t_{N+2}$; $p_{N+3,k=1,...,K}$ at $t_{N+3}$, $p_{N-4,k=1,...,K}$ at $t_{N+4}$; and $p_{N-5,k=1,...,K}$ at $t_{N+5}$. Thus, although multiple feature vectors are presented as input to the neural network 602 at each neural network time step, the conventional output set of emission probabilities applies to the HMM states at just one frame time, corresponding to just one frame of input audio data.

Figure 7:
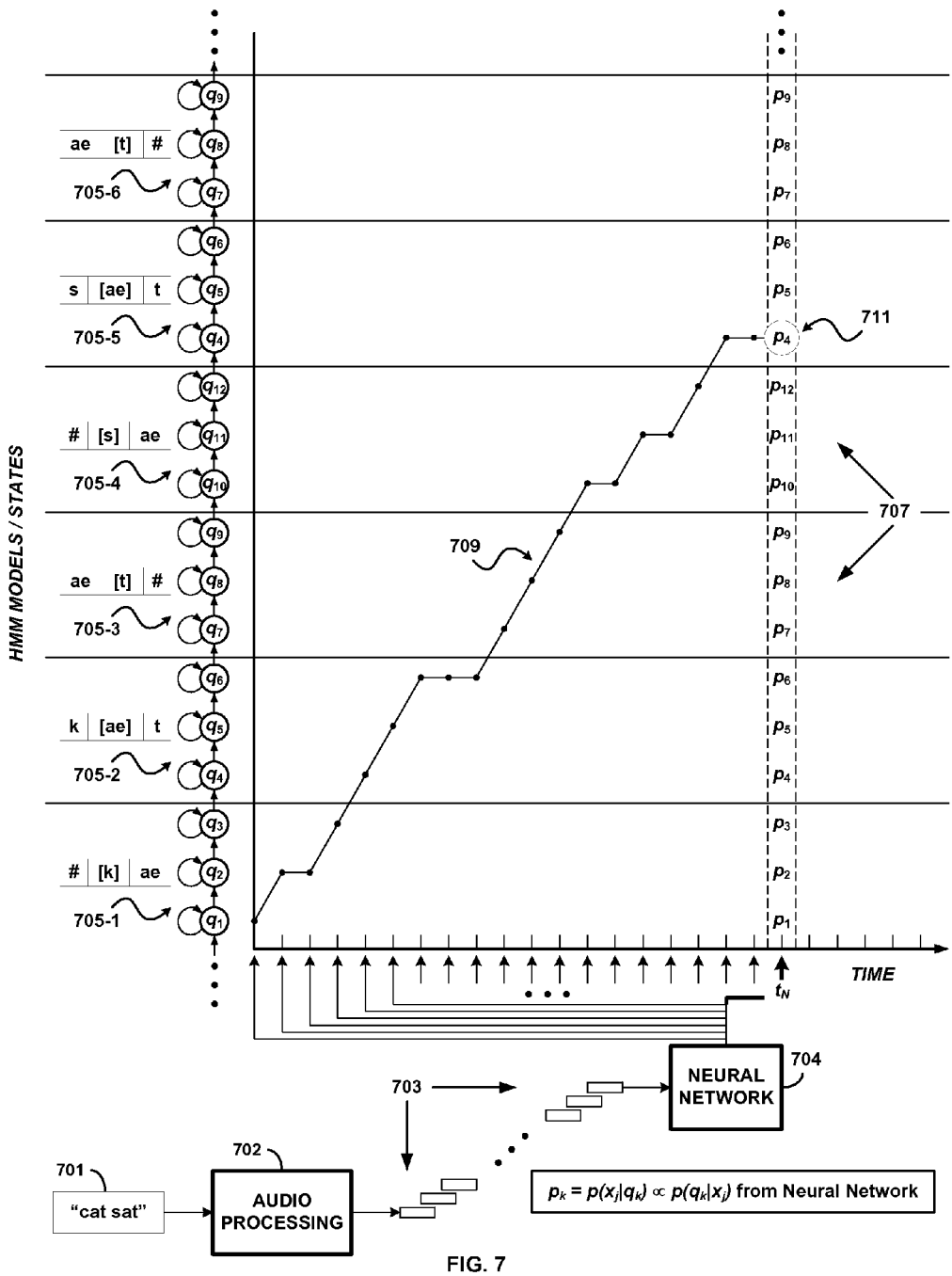
FIG. 7 is a schematic illustration of applying conventionally-determined emission probabilities to hidden Markov models to determine speech content represented in feature vectors.

Application of conventionally-determined emission probabilities to hidden Markov models to determine speech content represented in feature vectors is illustrated schematically in FIG. 7, which depicts a graph of observed acoustic data along a time (horizontal) axis versus HMM states along a vertical axis. In the figure, an example utterance 701 of "cat sat" is input to an audio processing module 702, which samples the input in frames and outputs a time sequence of feature vectors 703. The feature vectors 703 are then input to a neural network 704, which outputs respective sets of emission probabilities at each neural network time step. The feature vectors 703 may be considered analogous to the feature vectors 601 shown in FIG. 6, and the neural network 704 may be considered analogous to the neural network 602 also in FIG. 6. Output of the emission probabilities at neural network time steps is represented as a series of short vertical arrows at times marked along the horizontal time axis, and occurs at the frame rate.

A multiplicity of HMMs 705-1, 705-2, 705-3, 705-4, 705-5, and 705-6 is represented as a portion of a concatenation of HMM states pictured along the vertical axis in FIG. 7. Each HMM is used to model a respective triphone, and includes three states corresponding to three acoustic phases of the respective triphone. Each state is represented as a circle enclosing a state label $q_k$, such as $q_1$, $q_2$, $q_3$, etc. An arrow connecting adjacent states signifies a transition between the connected states, while a loop-shaped arrow signifies a "self-transition" that leaves a state unchanged after a given time step.

By way of example, the HMM 705-1 includes states $q_1$, $q_2$, and $q_3$ for modeling the triphone states #[k]ae.1, #[k]ae.2, and #[k]ae.3 of the triphone #[k]ae. Similarly, the HMM 705-2 includes states $q_4$, $q_5$, and $q_6$ for modeling the triphone states k[ae]t.1, k[ae]t.2, and k[ae]t.3 of the triphone k[ae]t. Continuing in this way, the HMM 705-3 includes states $q_7$, $q_8$, and $q_9$ for modeling the triphone states ae[t]#.1, ae[t]#.2, and ae[t]#.3 of the triphone ae[t]#; the HMM 705-4 includes states $q_{10}$, $q_{11}$, and $q_{12}$ for modeling the triphone states #[s]ae.1, #[s]ae.2, and #[s]ae.3 of the triphone #[s]ae; the HMM 705-5 includes states $q_4$, $q_5$, and $q_6$ for modeling the triphone states s[ae]t.1, s[ae]t.2, and s[ae]t.3 of the triphone s[ae]t; and the HMM 705-6 includes states $q_7$, $q_8$, and $q_9$ for modeling the triphone states ae[t]#.1, ae[t]#.2, and ae[t]#.3 of the triphone ae[t]#.

Note that, for purposes of illustration, the HMM 705-2 for k[ae]t and the HMM 705-5 for s[ae]t are made up of the same states $q_4$, $q_5$, and $q_6$. This repetition of states is meant to represent how HMM and HMM states may be shared among similar triphones. Similarly, the HMM 705-3 for ae[t]# and the HMM 705-6 also for ae[t]# are made up of the same states $q_7$, $q_8$, and $q_9$. The sharing of states is an example of "clustering" of similar triphones, which may help reduce the number of states that needs to be considered at each time step, as described below.

For a conventional HNN/HMM implementation such as in the present example, the neural network 704 outputs of K emission probabilities for the states of the HMMs at each neural network time step; i.e. at the frame rate. By applying the K emission probabilities to the K HMM states, one of the K states is determined to be most probable at each neural network time step. By repeating this determination at each neural network time step, a path 709 through the graph of observed acoustic data versus HMM states is mapped out by connecting successive points in the graph, also at the frame rate. The path 709 then represents the most likely sequence of HMMs and HMM states, and thereby yields the sequence of triphones in the corpus that most probably corresponds to the input utterance 701, as represented in the feature vectors 703.

By way of example in FIG. 7, a set of emission probabilities 707 is shown as being output from the neural network 704 at a current neural network time step $t_N$. The emission probabilities 707 are labeled as $p_1$, $p_2$, $p_3$, $p_4$, ..., and may be applied to similarly indexed HMM states. Note that $p_4$, $p_5$, and $p_6$ are repeated for the HMMs 705-2 and 705-5. Similarly, $p_7$, $p_8$, and $p_9$ are repeated for the HMMs 705-3 and 705-6. As indicated by the circle 711 enclosing probability $p_4$, the HMM state $q_4$ of the HMM 705-5 is the most probable next state in this example. The immediately preceding state in this example was also $q_4$ of the HMM 705-5. A legend at the lower right of FIG. 7 reiterates the proportional relation between the a priori emission probabilities and the a posteriori conditional probabilities generated by the neural network.

As indicated by the vertical ellipses extending from HMM 705-6, there may be additional HMMs (and states) available to model the input utterance 701. In particular, considering 40 phonemes (the approximate number for spoken English), there could be approximately $40^3$=64,000 triphones, and thus 3×64,000=192,000 possible HMM states to consider for each feature vector. Clustering of similar triphones and/or triphone acoustic phases, plus constraints that may rule out certain sequences of states, may reduce this number to approximately 8,000 HMM states. Clustering is represented in FIG. 7 by the repetition of states (e.g., for HMMs 705-2 and 705-5; and for HMMs 705-3 and 705-6), and the repetition of emission probabilities (e.g., $p_4$, $p_5$, and $p_6$; and $p_7$, $p_8$, and $p_9$). Thus, while the particular HMMs shown in FIG. 7 may be considered those that yield the best (most probable) sequence of states for the input feature vectors, in practice, there may be many more to consider at each neural network time step; e.g., on the order of 8,000 per neural network time step. In a conventional HNN/HMM implementation, all 8,000 emission probabilities may be determined at each neural network time step.

The conventional determination of emission probabilities at the frame rate, as well as their application to HMMs also at the frame rate, may lead to, or impose, inefficient operation of both the neural network and HMM predictive modeling of an HNN/HMM-based ASR system. This may be particularly the case, since multiple feature vectors are already presented as input to the neural network at each time step. Accordingly, it would be desirable to devise approaches and implementations that may improve the efficiency and speed of ASR systems that employ hybrid neural network/hidden Markov models.

c. Example Multi-Frame Prediction Applied to HNN/HMMs

In accordance with example embodiments, a HNN/HMM-base ASR system may determine emission probabilities for multiple frames of input, corresponding to multiple feature vectors, at "expanded time steps" that are separated one to the next by increments of multiple frame time steps. At each expanded time step, multiple feature vectors may be input to the neural network, as may also be done at each frame time step in conventional operation. However, unlike in conventional operation, at each expanded time step, emission probabilities for multiple frame time steps will be determined concurrently, and the determined emission probabilities may be applied concurrently to HMMs associated with multiple frame time steps. Operation in this manner is referred to herein as multi-frame prediction, and a system implemented to carry out multi-frame prediction may be considered a multi-frame prediction HNN/HMM-based system.

Figure 8:
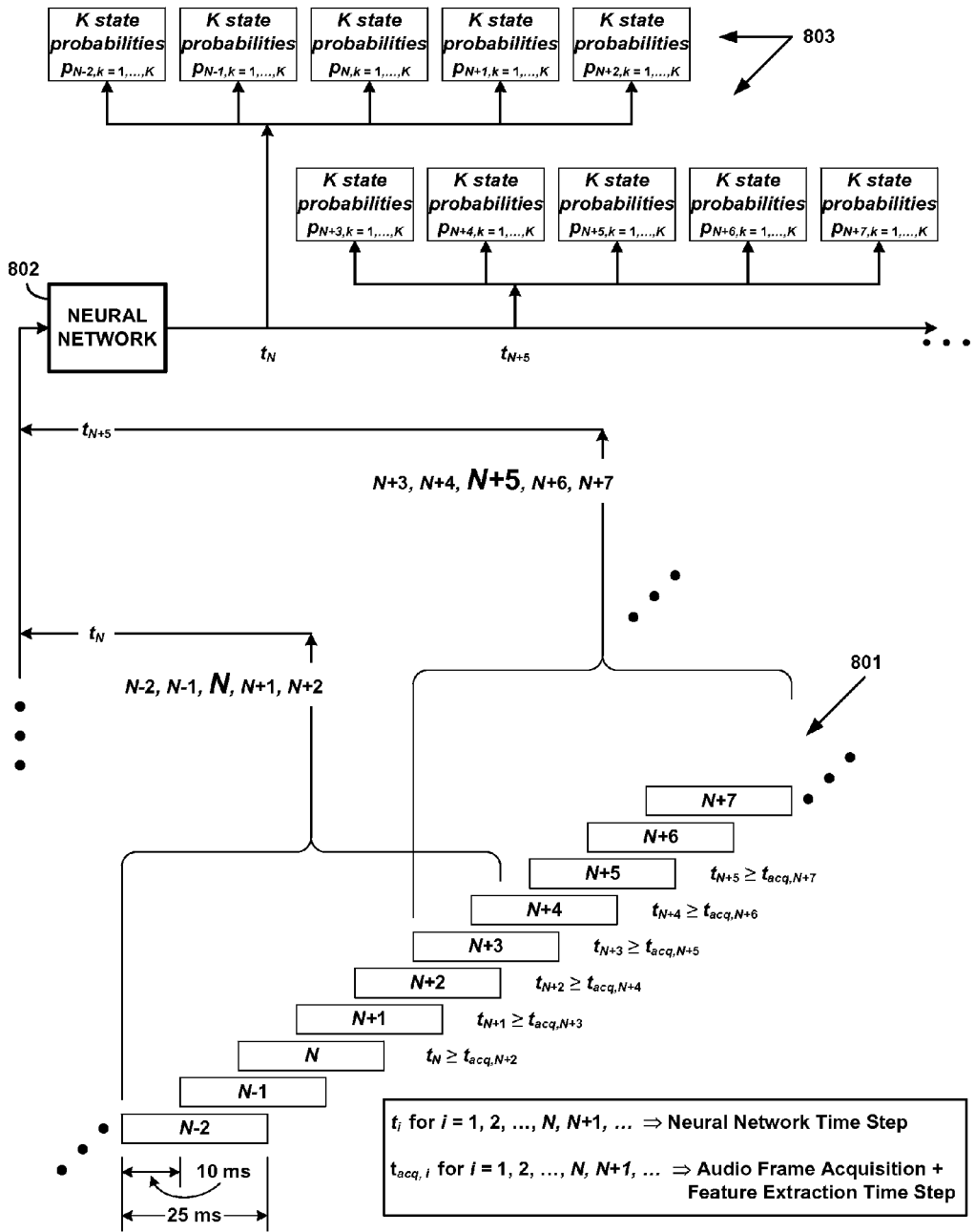
FIG. 8 is a schematic illustration of processing of feature vectors with a neural network to determine emission probabilities for hidden Markov models, in accordance with a first form of operation of an example embodiment.

FIG. 8 is a conceptual illustration of processing of feature vectors with a neural network to determine emission probabilities for hidden Markov models, in accordance with a first form of operation of an example embodiment of multi-frame prediction. As in FIG. 6, FIG. 8 depicts a time sequence of feature vectors 801 represented by a staircase of overlapping rectangles labeled, by way of example, N−2, N−1, . . . , N, N+1, . . . , N+7, where each label corresponds to a frame time step at which the input audio data was acquired (e.g., digitally sampled). As in the FIG. 6 example, each frame in FIG. 8 is 25 ms in duration, and slides in 10 ms increments, corresponding to a frame period of 10 ms and a frame rate of 100 frames per second. These values are just examples, as other frame periods and/or increments could be used.

In the example of FIG. 8, feature vectors are presented as input to a neural network 802 every five frame time steps, corresponding to the expanded time step. As shown, for example, feature vectors corresponding to frame times $t_{ack,N-2}$, $t_{ack,N-1}$, $t_{ack,N}$, $t_{ack,N+1}$, and $t_{ack,N+2}$ (and labeled N−2, N−1, N, N+1, and N+2) are input to the neural network 802 at expanded time step $t_N$. The neural network 802 then outputs emission probabilities for all five frame time steps at the same time. This is indicated by a first set of "K state probabilities" 803, labeled $p_{N-2,k=1}, \ldots, K$, $p_{N-1,k=1}, \ldots, K$, $p_{N,k=1}, \ldots, K$, $p_{N+1,k=1}, \ldots, K$, and $p_{N+2,k=1}, \ldots, K$, all output from the neural network 802 at the expanded time step $t_N$.

Continuing with the example in FIG. 8, feature vectors corresponding to frame times $t_{ack,N+3}$, $t_{ack,N+4}$, $t_{ack,N+5}$, $t_{ack,N+6}$, and $t_{ack,N+7}$ (and labeled N+3, N+4, N+5, N+6, and N+7) are shown at being input to the neural network 802 at expanded time steps $t_N$. The neural network 802 then outputs emission probabilities for all five frame time steps at the same time. This is indicated by a second set of "K state probabilities" 803, labeled $p_{N+3,k=1}, \ldots, K$, $p_{N+4,k=1}, \ldots, K$, $p_{N+5,k=1}, \ldots, K$, $p_{N+6,k=1}, \ldots, K$, and $p_{N+7,k=1}, \ldots, K$, all output from the neural network 802 at the expanded time step $t_{N+5}$. Although not shown explicitly in FIG. 8, a next sequence of five feature vectors could be presented as input to the neural network 802 at expanded time step $t_{N+10}$, corresponding to frame times $t_{ack,N+8}$, $t_{ack,N+9}$, $t_{ack,N+10}$, $t_{ack,N+11}$, and $t_{ack,N+12}$, and so on.

In further accordance with example embodiments, a neural network (e.g., neural network 802) may be trained to concurrently generate multiple sets of emission probabilities from multiple feature vectors input at a common time step. In this way, the run-time operation of the neural network 802 described above, in which five sets of K state probabilities 803 are concurrently generated for each sequence of five feature vectors input at each expanded time step, may be facilitated by a prior training procedure applied to training data (e.g., speech units of the corpus). Further, concurrent processing multiple input feature vectors by the neural network 802 may enable correlations among the multiple feature vectors to be folded into the concurrent generation of the multiple sets of emission probabilities.

As with the example in FIG. 6 of conventional determination of emission probabilities, $t_{ack,i}$ and $t_i$ should satisfy $t_{i=N} \geq t_{ack,i=N+m}$, where m is the number of additional feature vectors (and frames) following frame N. In multi-frame prediction, as shown in the example in FIG. 8, a set of emission probabilities is determined for all input feature vectors in a single (expanded) time step. In this example, the feature vectors at the beginning and end of each input sequence—e.g., those corresponding to frames N−2 and N+2 in the sequence input at $t_N$, and those corresponding to N+3 and N+7 in the sequence input at $t_{N+5}$—may lack context. This can be addressed by including additional feature vectors in each sequence that are input to the neural network, but not processed to produce additional sets of emission probabilities.

Figure 9:
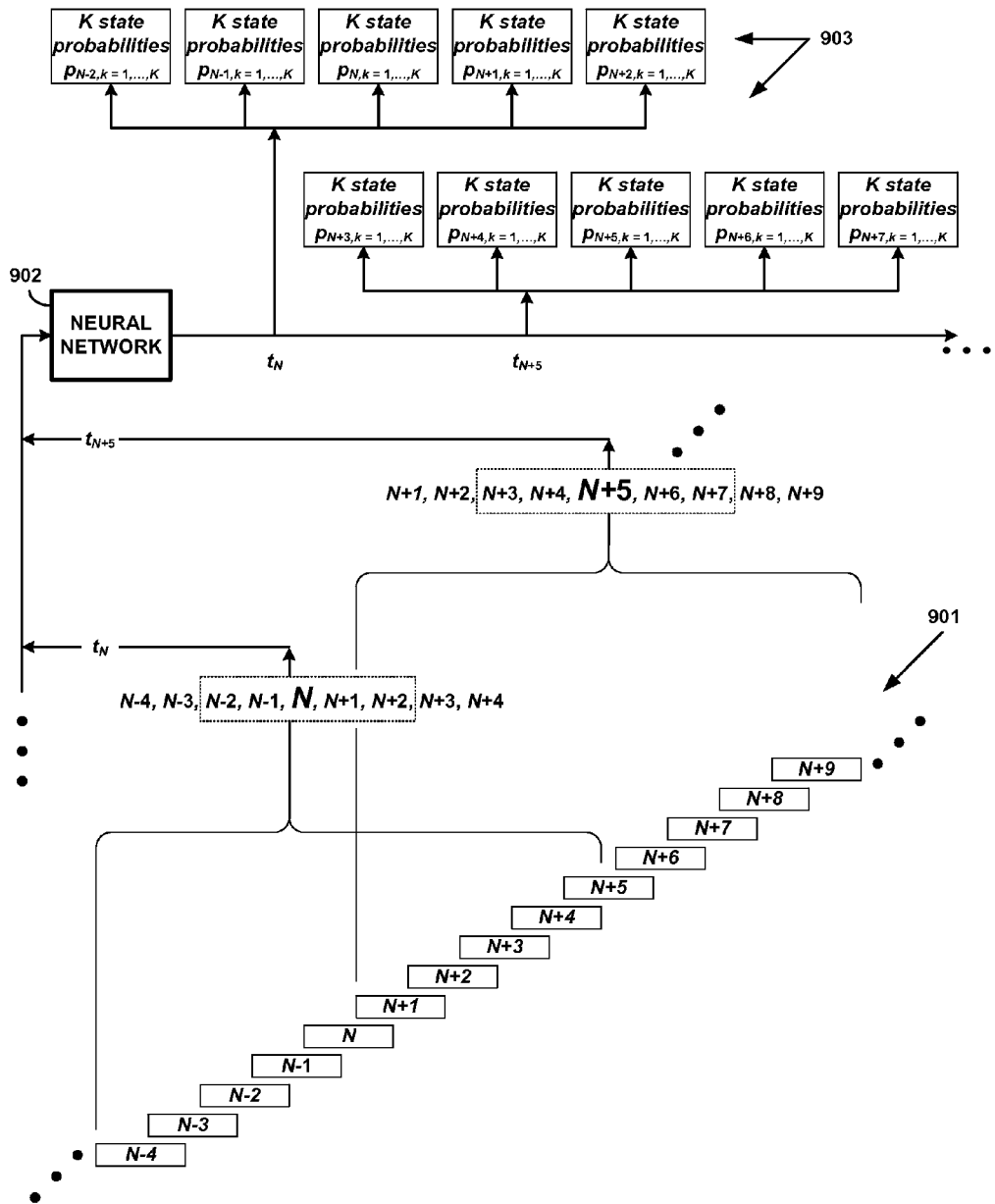
FIG. 9 is a schematic illustration of processing of feature vectors with a neural network to determine emission probabilities for hidden Markov models, in accordance with a second form of operation of an example embodiment.

FIG. 9 is a conceptual illustration of processing of feature vectors with a neural network to determine emission probabilities for hidden Markov models, in accordance with a second form of operation of an example embodiment of multi-frame prediction that adds additional context. In particular, FIG. 9 depicts a time sequence of feature vectors 901 is represented by a staircase of overlapping rectangles labeled, by way of example, N−4, N−3, . . . , N, N+1, . . . , N+9, where each label again corresponds to a frame time step at which the input audio data was acquired (e.g., digitally sampled).

In the example of FIG. 9, feature vectors are presented as input to a neural network 902 again at every five frame time steps, corresponding to the expanded time step. For the example in FIG. 9, a sequence of nine feature vectors corresponding to frame times $t_{ack,N-4}$, $t_{ack,N-3}$, $t_{ack,N-2}$, $t_{ack,N-1}$, $t_{ack,N}$, $t_{ack,N+1}$, $t_{ack,N+2}$, $t_{ack,N+3}$, and $t_{ack,N+4}$ (and labeled N−4, N−3, N−2, N−1, N, N+1, N+2, N+3, and N+4) is shown as being input to the neural network 902 at expanded time step $t_N$. The feature vectors corresponding to frames N−4, N−3, N+3, and N+4 provide context for the feature vectors corresponding to frames N−2, N−1, N, N+1, and N+2. This is signified by the dashed rectangle enclosing the labels N−2, N−1, N, N+1, and N+2 in FIG. 9. The neural network 902 then outputs emission probabilities for the five frame time steps N−2, N−1, N, N+1, and N+2 at the same time. This is indicated by a first set of "K state probabilities" 903, labeled $p_{N-2,k=1}, \ldots, K$; $p_{N-1,k=1}, \ldots, K$, $p_{N,k=1}, \ldots, K$, $p_{N+1,k=1}, \ldots, K$; and $p_{N+2,k=1}, \ldots, K$, all output from the neural network 902 at the expanded time step $t_N$. Sets of emission probabilities corresponding to the context frames (i.e., frames N−4, N−3, N+3, and N+4) are not generated at this expanded time step.

Continuing with the example in FIG. 9, feature vectors corresponding to frame times $t_{ack,N+1}$, $t_{ack,N+2}$, $t_{ack,N+3}$, $t_{ack,N+4}$, $t_{ack,N+5}$, $t_{ack,N+6}$, $t_{ack,N+7}$, $t_{ack,N+8}$, and $t_{ack,N+9}$ (and labeled N+1, N+2, N+3, N+4, N+5, N+6, N+7, N+8, and N+9) are shown as being input to the neural network 902 at expanded time step $t_{N+5}$. The feature vectors corresponding to frames N+1, N+2, N+8, and N+9 provide context for the feature vectors corresponding to frames N+3, N+4, N+5, N+6 and N+7. Again, this is signified by the dashed rectangle enclosing the labels N+3, N+4, N+5, N+6 and N+7 in FIG. 9. The neural network 902 then outputs emission probabilities for the five frame time steps N+3, N+4, N+5, N+6 and N+7 at the same time. This is indicated by a second set of "K state probabilities" 903, labeled $p_{N+3,k=1,...,K}$, $p_{N+6,k=1,...,K}$; and $p_{N+7,k=1,...,K}$, all output from the neural network 902 at the expanded time step $t_{N+5}$. Sets of emission probabilities corresponding to the context frames (i.e., frames N+1, N+2, N+8, and N+9) are not generated at this expanded time step. Although not shown explicitly in FIG. 9, a next sequence of nine feature vectors could be presented as input to the neural network 902 at expanded time step $t_{N+10}$, corresponding to frame times $t_{ack,N+6}$, $t_{ack,N+7}$, $t_{ack,N+8}$, $t_{ack,N+9}$, $t_{ack,N+10}$, $t_{ack,N+11}$, $t_{ack,N+12}$, $t_{ack,N+13}$, and $t_{ack,N+14}$, and so on.

As with the example in FIG. 8, the neural network 902 may be trained to concurrently generate multiple sets of emission probabilities from multiple feature vectors input at a common time step. Thus, the run-time operation of the neural network 902 described above, in which five sets of K state probabilities are concurrently generated for each sequence of nine feature vectors input at each expanded time step, may be facilitated by a prior training procedure applied to training data (e.g., speech units of the corpus). Again, concurrent processing multiple input feature vectors by the neural network 902 may enable correlations among the multiple feature vectors to be folded into the concurrent generation of the multiple sets of emission probabilities.

It will be appreciated that the above examples could be generalized to sequences of feature vectors (and corresponding frames) of longer or shorter length. For example, sequences of 15 feature vectors could be presented to the neural network every nine time steps, and the neural network could determine emission probabilities for the HMMs at the middle nine time steps of each sequence. Other sequence configurations are possible as well.

In the examples in FIG. 8 and FIG. 9, five sets of emission probabilities are output by the neural network 802 and 902, respectively, at every expanded time step. Since the expanded time step in this example is equal to five frame time steps, the expanded neural network processing period is five times longer than the frame period. While it may appear at first glance that multi-frame prediction produces the same number of sets of emission probabilities in the same amount of time as conventional determination—e.g., five sets in one expanded time step versus five sets in five frame time steps—concurrent generation of all five sets of emission probabilities at expanded time steps may in practice be achieved more efficiently by the neural networks 802 and 902 than generating one set at each frame time step in a conventional system.

More particularly, the multiple feature vectors may provide context for the single frame that is processed in a conventional system, as discussed above. In practice, feature vectors in a sequence may tend to evolve slowly and/or smoothly from one to the next. Consequently, the context provided by multiple feature vectors may also evolve slowly and/or smoothly. This may allow a neural network to concurrently determine emission probabilities at some or all of the multiple frame time steps represented in multiple input feature vectors.

In order to determine multiple sets of emission probabilities at once, a neural network of expanded size compared with that in a conventional system may be used. For example, a neural network may include one or more layers of processing nodes. A neural network may be increased in size by increasing the number of layers and/or the number of nodes per layer. An expanded or larger neural network may also correspond to increased memory to accommodate increased storage (e.g., more layers and/or nodes), more processor resources, in processor cycles and/or number of concurrent (e.g., parallel) processors, and other resource-dependent implementation elements.

However, determining multiples sets of emission probabilities concurrently for multiple frames instead of as a single set for just a single frame does not necessarily require expanding the size of the neural network in proportion to the number of multiple sets determined. For example, expanding a neural network size by a factor of three could increase the number of sets of emission probabilities that can be determined concurrently by a factor of 10 or more. Thus, determining multiple sets concurrently may lead to a net processing gain, and a corresponding increase in efficiency.

This is just one example of a net processing/efficiency gain. The actual size of the neural network used in example embodiments could depend on various factors, including the fundamental speech units of the acoustic model, the language model, the training procedure, and one or more (other) implementation-specific considerations. The efficiency gain of a larger neural network may also depend on similar factors.

Figure 10:
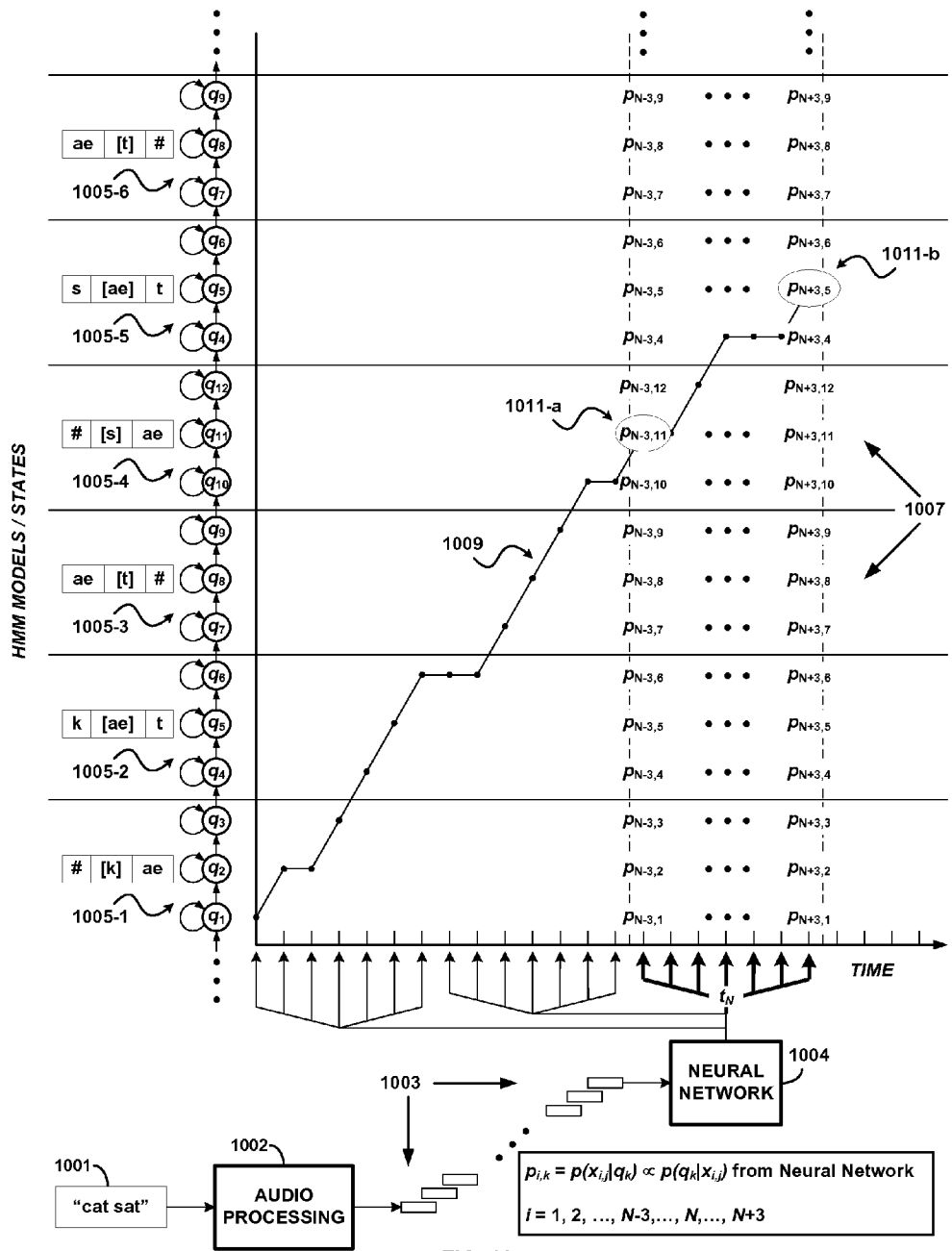
FIG. 10 is a schematic illustration of applying emission probabilities to hidden Markov models to determine speech content represented in feature vectors, in accordance with an example embodiment.

As noted above, the multiple sets of emission probabilities generated concurrently in multi-frame prediction can be concurrently applied to the HMMs at each expanded time step. FIG. 10 is a schematic illustration of concurrently applying multiple sets of emission probabilities to hidden Markov models to determine speech content represented in feature vectors, in accordance with an example embodiment. As with FIG. 7, FIG. 10 depicts a graph of observed acoustic data along a time (horizontal) axis versus HMM states along a vertical axis. In the figure, an example utterance 1001 of "cat sat" is input to an audio processing module 1002, which samples the input in frames and outputs a time sequence of feature vectors 1003. The feature vectors 1003 are then input to a multi-frame prediction neural network 1004, which concurrently outputs multiple sets of emission probabilities at expanded time steps.

By way of example, seven sets of emission probabilities, corresponding to seven frame time steps, are determined and output at each of three expanded time steps of the illustration. Output of the emission probabilities at neural network time steps is represented as a three series of seven short vertical arrows at times marked along the horizontal time axis; each series is centered at a respective example expanded time step. For purposes of illustration, the third of the three sets is labeled as expanded time $t_N$; the labels are omitted from the first and second set for the sake of brevity in the figure.

A multiplicity of HMMs 1005-1, 1005-2, 1005-3, 1005-4, 1005-5, and 1005-6 is represented as a portion of a concatenation of HMM states pictured along the vertical axis in FIG. 10. As with the example in FIG. 7, each HMM in FIG. 10 is used to model a respective triphone, and includes three states corresponding to three acoustic phases of the respective triphone. Each state is again represented as a circle enclosing a state label $q_k$, such as $q_1$, $q_2$, $q_3$, etc. An arrow connecting adjacent states signifies a transition between the connected states, while a loop-shaped arrow signifies a "self-transition" that leaves a state unchanged after a given time step. For the HMMs included in FIG. 10, the triphones and the associated acoustic phases modeled are the same as those in FIG. 7. The HMMs labeled "1005" in FIG. 10 correspond to the HMMs labeled "705" in FIG. 7.

For multi-frame prediction applied to a HNN/HMM implementation such as in the present example, the seven sets of K emission probabilities output concurrently by neural network 1004 at each expanded time step are applied concurrently to HMMs at seven frame time steps. Again, the specification of seven sets is just an example; other numbers could be used.

Note that the illustration in FIG. 10 does not necessarily indicate how many feature vectors are input to the neural network 1004 at each expanded time step in order to concurrently generate the seven sets of emission probabilities at each expanded time step. From the explanation above, in which each set of emission probabilities corresponds to a feature vector, it may be assumed that at least seven feature vectors are input to the neural network 1004 at each expanded time step.

By applying seven times the K emission probabilities to the seven times K HMM states, one of the K states at each of the seven frame time steps is determined to be most probable at each expanded time step. By repeating this determination at each expanded time step, a path 1009 through the graph of observed acoustic data versus HMM states is mapped out by connecting successive points in the graph, also at the frame rate. The path 1009 then represents the most likely sequence of HMMs and HMM states, and thereby yields the sequence of triphones in the corpus that most probably corresponds to the input utterance 1001, as represented in the feature vectors 1003.

By way of example in FIG. 10, seven sets of emission probabilities 1007 is shown as being output from the neural network 1004 at a current expanded time step $t_N$. The seven sets correspond to frame time steps N−3, N−2, N−1, N, N+1, N+2, and N+3. The emission probabilities 1007 are labeled as $p_{N-3,1}$, $p_{N-3,2}$, $p_{N-3,3}$, $p_{N-3,4}$, $\ldots$; $p_{N-2,1}$, $p_{N-2,2}$, $p_{N-2,3}$, $p_{N-2,4}$, $\ldots$; $\ldots$; $p_{N,1}$, $p_{N,2}$, $p_{N,3}$, $p_{N,4}$, $\ldots$; $\ldots$; $p_{N+3,1}$, $p_{N+3,2}$, $p_{N+3,3}$, $p_{N+3,4}$ $\ldots$, and may be applied to similarly indexed HMM states. Note that probabilities may be repeated for similar or like the HMM states. This is represented for illustrative purposes for the HMM states 1005-2 and 1005-5, and again for the HMMs 1005-3 and 1005-6. The circles 1011-*a* and 1011-*b* enclosing, by way of example, probabilities $p_{N-3,11}$ and $p_{N+3,5}$, correspond to most probable next states in the path at the first and last frame time steps of the seven sets of HMMs. A legend at the lower right of FIG. 10 reiterates the proportional relation between the a prior emission probabilities and the a posteriori conditional probabilities generated by the neural network.

It will be appreciated that the path mapping illustrated in FIG. 10 is intended as an example of how multi-frame prediction may be applied in a HNN/HMM-based ASR system. The number of HMM states that need to be considered at each of the frame time steps within an expanded time step may depend on the size of the expanded time step, among other factors. However, concurrent determination of multiple sets of emission probabilities, as well as concurrent application of the multiple sets to the HMMs can yield increase speed and efficiency compared with conventional HNN/HMM implementation. It will also be appreciated that the multiple sets of emission probabilities could be generated concurrently by a neural network, and then each of the multiple sets could be applied sequentially to the HMMs, rather than concurrently.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:

1. A method comprising:
   transforming an audio input signal, using one or more processors of a system, into a first time sequence of feature vectors, each respective feature vector of the first time sequence bearing quantitative measures of acoustic properties of a corresponding, respective temporal frame of a first sequence of temporal frames of the audio input signal;
   providing, at a first time step, the first time sequence of feature vectors as input to a neural network (NN) implemented by the one or more processors of the system;
   by concurrently processing the feature vectors in the first time sequence with the NN during the first time step, concurrently determining emission probabilities corresponding to all the temporal frames of the first sequence of temporal frames, wherein concurrently determining the emission probabilities corresponding to all the temporal frames of the first sequence of temporal frames comprises: during a common time interval, determining for each feature vector in the first time sequence a respective set of emission probabilities for a first plurality of hidden Markov models (HMMs); and
   concurrently applying the emission probabilities determined at the first time step for the feature vectors in the first time sequence to the first plurality of HMMs to determine speech content corresponding to the first sequence of temporal frames of the audio input signal.

2. The method of claim 1, further comprising:
   providing, at a second time step, a second time sequence of feature vectors as input to the NN, the second time sequence corresponding to a second sequence of temporal frames of the audio input signal, wherein the second time step follows the first time step by a multiple number of temporal frame periods;
   processing the feature vectors in the second time sequence concurrently by the NN, wherein processing the feature vectors in the second time sequence concurrently by the NN comprises determining, at the second time step, for each feature vector in the second time sequence a respective set of emission probabilities for a second plurality of HMMs; and
   applying the emission probabilities determined at the second time step for the feature vectors in the second time sequence to the second plurality of HMMs to determine speech content corresponding to the second sequence of temporal frames of the audio input signal.

3. The method of claim 2, wherein the first plurality of HMMs and the second plurality of HMMs share at least one HMM in common.

4. The method of claim 1, wherein the NN and the first plurality of HMMs are implemented by at least one common processor from among the one or more processors of the system.

5. The method of claim 1, wherein the quantitative measures of acoustic properties are at least one of Mel Filter Cepstral coefficients, Perceptual Linear Predictive coefficients, Relative Spectral coefficients, and Filterbank log-energy coefficients.

6. The method of claim 1, wherein providing the first time sequence of feature vectors as input to the NN comprises:
   providing concurrently with the first time sequence of feature vectors at least one feature vector corresponding to a temporal frame that temporally precedes the first sequence of temporal frames; and
   providing concurrently with the first time sequence of feature vectors at least one feature vector corresponding to a temporal frame that temporally follows the first sequence of temporal frames.

7. The method of claim 1, wherein the first plurality of HMMs collectively comprise a multiplicity of states, and wherein determining for each feature vector in the first time sequence a respective set of emission probabilities for the first plurality of HMMs comprises:

for each respective feature vector in the first time sequence, determining, at the first time step, for each respective state of the multiplicity of states a respective conditional probability of emitting the respective feature vector given the respective state.

8. The method of claim 7, wherein each of the HMMs in the first plurality is associated with a respective elemental speech unit, and has one or more states corresponding to one or more temporal phases of the associated, respective elemental speech unit, wherein the multiplicity of states comprises a collection of the one or more states of each of the HMMs in the first plurality, and wherein determining speech content corresponding to the first sequence of temporal frames of the audio input signal comprises determining a probable sequence of elemental speech units based on a most likely sequence of states of the multiplicity.

9. The method of claim 8, wherein each elemental speech unit in the probable sequence of elemental speech units is a phoneme, triphone, or quinphone.

10. The method of claim 1, wherein determining speech content corresponding to the first sequence of temporal frames of the audio input signal comprises at least one of generating a text string of the speech content and identifying a computer-executable command based on the speech content.

11. A system comprising:
one or more processors;
memory; and
machine-readable instructions stored in the memory, that upon execution by the one or more processors cause the system to carry out operations comprising:

transforming an audio input signal into a first time sequence of feature vectors, wherein each respective feature vector of the first time sequence bears quantitative measures of acoustic properties of a corresponding, respective temporal frame of a first sequence of temporal frames of the audio input signal, providing, at a first time step, the first time sequence of feature vectors as input to a neural network (NN) implemented by the system, by concurrently processing the feature vectors in the first time sequence with the NN during the first time step, concurrently determining emission probabilities corresponding to all the temporal frames of the first sequence of temporal frames, wherein concurrently determining the emission probabilities corresponding to all the temporal frames of the first sequence of temporal frames comprises: during a common time interval, determining for each feature vector in the first time sequence a respective set of emission probabilities for a first plurality of hidden Markov models (HMMs), and concurrently applying the emission probabilities determined at the first time step for the feature vectors in the first time sequence to the first plurality of HMMs to determine speech content corresponding to the first sequence of temporal frames of the audio input signal.

12. The system of claim 11, wherein the operations further comprise:

providing, at a second time step, a second time sequence of feature vectors as input to the NN, wherein the second time sequence corresponds to a second sequence of temporal frames of the audio input signal, and wherein the second time step follows the first time step by a multiple number of temporal frame periods, processing the feature vectors in the second time sequence concurrently by the NN, wherein processing the feature vectors in the second time sequence concurrently by the NN comprises determining, at the second time step, for each feature vector in the second time sequence a respective set of emission probabilities for a second plurality of HMMs, and applying the emission probabilities determined at the second time step for the feature vectors in the second time sequence to the second plurality of HMMs to determine speech content corresponding to the second sequence of temporal frames of the audio input signal.

13. The system of claim 11, wherein the quantitative measures of acoustic properties are at least one of Mel Filter Cepstral coefficients, Perceptual Linear Predictive coefficients, Relative Spectral coefficients, and Filterbank log-energy coefficients.

14. The system of claim 11, wherein each of the HMMs in the first plurality is associated with a respective elemental speech unit and has one or more states corresponding to one or more temporal phases of the associated, respective elemental speech unit, and wherein determining the speech content corresponding the first sequence of temporal frames of the audio input signal comprises determining a probable sequence of elemental speech units based on a most likely sequence of states from among the one or more states of each of the HMMs in the first plurality.

15. An article of manufacture including a non-transitory, computer-readable storage medium, having stored thereon program instructions that, upon execution by one or more processors of a system, cause the system to perform operations comprising:

transforming an audio input signal into a first time sequence of feature vectors, wherein each respective feature vector of the first time sequence bears quantitative measures of acoustic properties of a corresponding, respective temporal frame of a first sequence of temporal frames of the audio input signal;

providing, at a first time step, the first time sequence of feature vectors as input to a neural network (NN) implemented by the system;

by concurrently processing the feature vectors in the first time sequence with the NN during the first time step, concurrently determining emission probabilities corresponding to all the temporal frames of the first sequence of temporal frames, wherein concurrently determining the emission probabilities corresponding to all the temporal frames of the first sequence of temporal frames comprises: during a common time interval, determining for each feature vector in the first time sequence a respective set of emission probabilities for a first plurality of hidden Markov models (HMMs); and concurrently applying the emission probabilities determined at the first time step for the feature vectors in the first time sequence to the first plurality of HMMs to determine speech content corresponding to the first sequence of temporal frames of the audio input signal.

16. The article of manufacture of claim 15, wherein the operations further comprise:

providing, at a second time step, a second time sequence of feature vectors as input to the NN, wherein the second time sequence corresponds to a second sequence of temporal frames of the audio input signal, and wherein the second time step follows the first time step by a multiple number of temporal frame periods;

processing the feature vectors in the second time sequence concurrently by the NN, wherein processing the feature vectors in the second time sequence concurrently by the NN comprises determining, at the second time step, for each feature vector in the second time sequence a respective set of emission probabilities for a second plurality of HMMs; and applying the emission probabilities determined at the second time step for the feature vectors in the second time sequence to the second plurality of HMMs to determine speech content of the second sequence of temporal frames of the audio input signal.

17. The article of manufacture of claim 15, wherein providing the first time sequence of feature vectors at the input of the NN comprises:

providing concurrently with the first time sequence of feature vectors at least one feature vector corresponding to a temporal frame that temporally precedes the first sequence of temporal frames; and providing concurrently with the first time sequence of feature vectors at least one feature vector corresponding to a temporal frame that temporally follows the first sequence of temporal frames.

18. The article of manufacture of claim 15, wherein each of the HMMs in the first plurality is associated with a respective elemental speech unit and has one or more states corresponding to one or more temporal phases of the associated, respective elemental speech unit, and wherein determining the speech content of the first sequence of temporal frames of the audio input signal comprises determining a probable sequence of elemental speech units based on a most likely sequence of states from among the one or more states of each of the HMMs in the first plurality.

19. The article of manufacture of claim 18, wherein each elemental speech unit in the probable sequence of elemental speech units is a phoneme, triphone, or quinphone.

20. The article of manufacture of claim 15, wherein determining speech content corresponding to the first sequence of temporal frames of the audio input signal comprises at least one of generating a text string of the speech content and identifying a computer-executable command based on the speech content.

* * * * *

UNITED STATES PATENT AND TRADEMARK OFFICE
CERTIFICATE OF CORRECTION

| | | |
|---|---|---|
| PATENT NO. | : 8,442,821 B1 | Page 1 of 1 |
| APPLICATION NO. | : 13/560706 | |
| DATED | : May 14, 2013 | |
| INVENTOR(S) | : Vincent Vanhoucke | |

It is certified that error appears in the above-identified patent and that said Letters Patent is hereby corrected as shown below:

In the claims:

In column 30, line 33, "haying" should read -- having --.

Signed and Sealed this
Sixteenth Day of July, 2013

Teresa Stanek Rea
*Acting Director of the United States Patent and Trademark Office*